US006841791B2

(12) United States Patent
DeMeo et al.

(10) Patent No.: US 6,841,791 B2
(45) Date of Patent: Jan. 11, 2005

(54) MULTIPLE HAZARD PROTECTION ARTICLES AND METHODS FOR MAKING THEM

(75) Inventors: Ronald DeMeo, Miami, FL (US); Joseph Kucherovsky, Philadelphia, PA (US)

(73) Assignee: Meridian Research and Development, Oakland Park, FL (US)

( * ) Notice: Subject to any disclaimer, the term of this patent is extended or adjusted under 35 U.S.C. 154(b) by 19 days.

(21) Appl. No.: 10/620,954

(22) Filed: Jul. 16, 2003

(65) Prior Publication Data

US 2004/0004196 A1 Jan. 8, 2004

Related U.S. Application Data

(63) Continuation-in-part of application No. 10/238,160, filed on Sep. 9, 2002, which is a continuation-in-part of application No. 09/940,681, filed on Aug. 27, 2001, now Pat. No. 6,459,091, which is a continuation-in-part of application No. 09/206,671, filed on Dec. 7, 1998, now Pat. No. 6,281,515.

(51) Int. Cl.[7] .............................. G21F 3/00; A61B 6/10
(52) U.S. Cl. .............................. 250/515.1; 250/516.1; 250/519.1
(58) Field of Search .......................... 250/515.1, 516.1, 250/519.1, 517.1; 75/415; 428/328; 252/478

(56) References Cited

U.S. PATENT DOCUMENTS

| | | | |
|---|---|---|---|
| 1,800,051 A | 4/1931 | Blanco | |
| 3,030,628 A | 4/1962 | Crosson | |
| 3,045,121 A | 7/1962 | Leguillon | |
| 3,052,799 A | 9/1962 | Hollands | |
| 3,164,840 A | 1/1965 | Reynolds | |
| 3,569,713 A | 3/1971 | Via, Jr. | |
| 3,883,749 A | 5/1975 | Whittaker et al. | |
| 3,974,104 A | 8/1976 | Foster et al. | |
| 4,103,176 A | 7/1978 | Coyle | |
| 4,129,524 A | 12/1978 | Nagai et al. | |
| 4,429,094 A | 1/1984 | Massucco | |
| 4,589,408 A | 5/1986 | Singer | |
| 4,740,526 A | 4/1988 | Yamamoto | |
| 4,882,392 A | 11/1989 | Smid et al. | |
| 4,891,399 A | 1/1990 | Ohkawa et al. | |
| 4,913,978 A | 4/1990 | Klotz et al. | |
| 4,938,233 A * | 7/1990 | Orrison, Jr. ................. 128/849 |

(List continued on next page.)

OTHER PUBLICATIONS

SU 1424847A Gorelashvi, G.P.; Kuus E.M.; Talvari, A.A.

Primary Examiner—Jack Berman
Assistant Examiner—Johnnie L Smith, II
(74) Attorney, Agent, or Firm—Townsend and Townsend and Crew LLP; Guy W. Chambers

(57) ABSTRACT

Articles, including fabrics and film layers, are disclosed which can protect against multiple hazards, including radiation, chemical, biological agents, metal projectiles and fire hazards. In some embodiments, the fabrics and films of the present invention are used to produce garments having protection against multiple hazards and superior heat dissipating properties. A radiation protective compound is preferably created by mixing a radiopaque material, such as barium, bismuth, tungsten or their compounds, with powdered polymer, pelletized polymer or a liquid solution, emulsion or suspension of a polymer in solvent or water. This radiation protective mixture can then be laminated or otherwise adhered to other types of protective films or fabric, such as the protective polymer films or fabrics used for chemical protective garments, biological protective garments, bullet proof vests or fire retardant garments. The principles of this invention can also be applied to a broad range of other articles including surgical hoods, hospital gowns, gloves, patient drapes, partitions, coverings, jumpsuits, ponchos, uniforms, fatigues, tents, probes, envelopes, pouches, wallpaper, liners, drywall, house sidings, house foundations, house roofings etc.

106 Claims, 16 Drawing Sheets

U.S. PATENT DOCUMENTS

| | | | |
|---|---|---|---|
| 4,989,266 A | | 2/1991 | Borgese et al. |
| 5,001,354 A | | 3/1991 | Gould et al. |
| 5,016,292 A | | 5/1991 | Rademacher |
| 5,038,047 A | | 8/1991 | Still |
| 5,059,807 A | * | 10/1991 | Kersten et al. .......... 250/519.1 |
| 5,140,710 A | | 8/1992 | Rademacher |
| 5,245,195 A | | 9/1993 | Shah et al. |
| 5,331,683 A | | 7/1994 | Stone et al. |
| 5,446,925 A | | 9/1995 | Baker et al. |
| 5,453,314 A | * | 9/1995 | Collier et al. ................ 428/198 |
| 5,506,059 A | | 4/1996 | Robbins |
| 5,523,581 A | | 6/1996 | Cadwalader et al. |
| 5,525,408 A | | 6/1996 | Weir et al. |
| 5,548,125 A | * | 8/1996 | Sandbank ................ 250/519.1 |
| 5,604,784 A | * | 2/1997 | Widlicka et al. ............. 378/203 |
| 5,637,113 A | | 6/1997 | Tartaglia et al. |
| 5,660,892 A | | 8/1997 | Robbins et al. |
| 5,778,888 A | * | 7/1998 | Sheehy ....................... 128/846 |
| 5,856,415 A | | 1/1999 | Lagace et al. |
| 6,153,666 A | * | 11/2000 | Lagace ....................... 523/136 |
| 6,281,515 B1 | | 8/2001 | Demeo et al. |
| 6,310,355 B1 | * | 10/2001 | Cadwalader ............. 250/515.1 |
| 6,459,091 B1 | | 10/2002 | DeMeo et al. |
| 6,548,570 B1 | * | 4/2003 | Lange ........................ 523/137 |
| 6,599,448 B1 | * | 7/2003 | Ehrhard et al. ............. 252/582 |
| 6,665,877 B1 | * | 12/2003 | Gray ............................... 2/69 |
| 6,674,087 B2 | * | 1/2004 | Cadwalader et al. ..... 250/515.1 |

\* cited by examiner

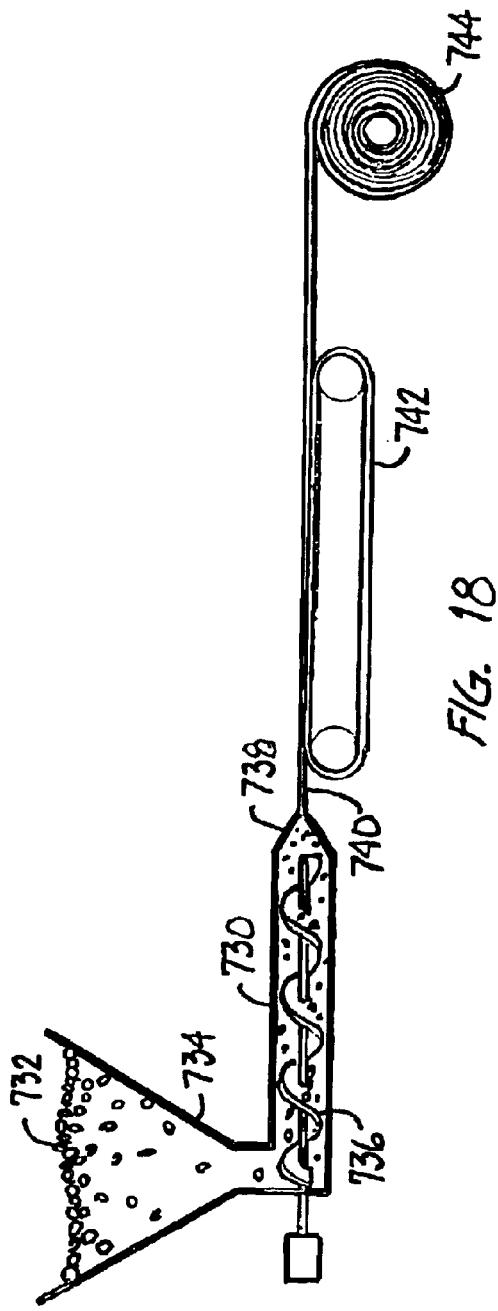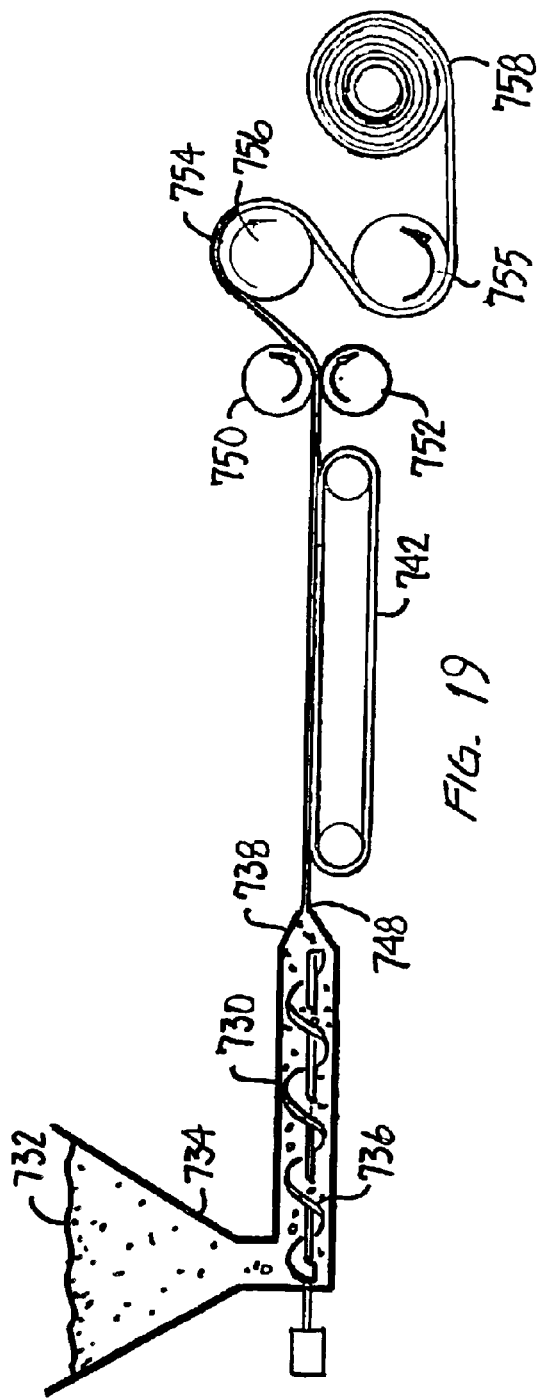
FIG. 18
FIG. 19

MULTIPLE HAZARD PROTECTION ARTICLES AND METHODS FOR MAKING THEM

CROSS-REFERENCES TO RELATED APPLICATIONS

This application is a continuation-in-part of pending application Ser. No. 10/238,160, filed Sep. 9, 2002, entitled "Lightweight Radiation Protective Articles And Methods For Making Them," which is itself a continuation-in-part of application Ser. No. 09/940,681, filed Aug. 27, 2001, entitled "Lightweight Radiation Protective Garments," and issued as U.S. Pat. No. 6,459,091 B1 on Oct. 1, 2002, which was a continuation-in-part of application Ser. No. 09/206,671, filed Dec. 7, 1998, entitled "Lightweight Radiation Protective Garments," and issued as U.S. Pat. No. 6,281,515 on Aug. 28, 2001.

FIELD OF THE INVENTION

The present invention relates to articles, including fabrics, compounds and film layers, which can provide protection against life threatening hazards, such as radiation, chemicals, biological agents, metal projectiles and fire. In some embodiments, the fabrics and films of the present invention are used to produce garments with multiple hazard protection and superior heat dissipating properties.

BACKGROUND OF THE INVENTION

There are many types of hazards today which can cause serious injury or even death. These hazards include radiation, corrosive or toxic chemicals, infectious biological agents, metal projectiles, such as bullets or shrapnel, and fire. While many of these hazards have been known for years, it has become more urgent and difficult to protect against them in light of recent terrorist activities, including the Sep. 11, 2001 terrorist attacks on the World Trade Center.

Many of the hazards faced today used to be thought of as localized to sites such as nuclear power plants, nuclear fuel processing plants, nuclear clean-up sites, x-ray scanners, chemical refineries and biological laboratories. Nonetheless, the growth of terrorism has extended these hazards to virtually any location. In the case of nuclear radiation, the detonation of a portable nuclear bomb, such as a "dirty bomb" incorporating nuclear waste material, could spread deadly radiation throughout a metropolitan area. Similarly, the release of infectious biological agents is no longer confined to biological research laboratories, but could occur anywhere that a terrorist chooses to release such infectious biological agents.

In addition to needing to protect against life threatening hazards over a much larger area, there is also a need to simultaneously protect against multiple types of hazards. For example, while one can obviously anticipate nuclear hazards at a nuclear power plant, the advent of terrorism means that it is now possible that deadly biological or chemical agents could be released at the same nuclear power plant. Similarly, while one tries to protect against the release of deadly biological agents at a biological research laboratory, the explosion by a terrorist of a "dirty bomb" near such a laboratory could introduce serious radiation hazards. For these reasons, it is no longer possible to provide effective protection by simply considering the most predicable types of hazards.

What is needed today is a way to effectively and economically provide protection against multiple types of hazards. In the past, for example, garments have been created to provide protection against a specific threat. In the case of radiation, there have been a number of previous attempts to mitigate the harmful effects of radiation through the creation of radiopaque protective garments. Typically, these radiopaque garments consisted of a stiff material, such as rubber, impregnated by lead or some other heavy metal which is capable of blocking radiation. Examples of lead impregnated radiopaque garments can be found in Holland's U.S. Pat. No. 3,052,799, Whittaker's U.S. Pat. No. 3,883,749, Leguillon's U.S. Pat. No. 3,045,121, Via's U.S. Pat. No. 3,569,713 and Still's U.S. Pat. No. 5,038,047. In other cases, radiopaque materials are incorporated into polymeric films, such as in Shah's U.S. Pat. No. 5,245,195 and Lagace's U.S. Pat. No. 6,153,666.

There have also been garments created to address the specific threat of metal projectiles, such as bullets or shrapnel. For example, Borgese's U.S. Pat. No. 4,989,266 and Stone's U.S. Pat. No. 5,331,683 disclose two types of bullet proof vests.

Additionally, fabrics have been developed to provide resistance to corrosive or toxic chemicals. Examples of such chemical protective fabrics can be found from a search of the internet. These chemical protective fabrics include polyethylene fabrics, such as DuPont's Tyvek®, polypropylene fabrics, such as Kimberly-Clark's Kleenguard® or Kappler's Proshield®, plastic laminate fabrics such as DuPont's TyChem® or Kimberly Clark's HazardGard I® and microporous-film based fabrics such as DuPont's NexGen® or Kappler's Proshield 2®. These chemical protective fabrics typically provide protection against biological agents also.

While these prior art fabrics, compounds and garments offer protection against the specific threats they are designed to address, they have a number of disadvantages. For example, while the lead filled prior art garments provide a good measure of protection against the harmful effects of radiation, these prior art garments are often heavy, stiff, expensive and bulky. As such, these garments are often uncomfortable, cumbersome and restrictive. Moreover, lead, of course, is a toxic substance which must be handled very carefully and cannot be carelessly disposed of. Also, there are sterilization and decontamination issues with these prior art radiation protective garments because they are typically too bulky, expensive and toxic to dispose of after each use.

Similarly, the bullet proof vests and bomb suits of the prior art tend to have poor heat dissipation properties. These bullet proof vests and bomb suits can be so uncomfortable to wear when it is hot that the user will choose to forego protection, rather than risk becoming overheated. This poor heat dissipation also has another disadvantage in military applications. When a soldier's body heat is allowed to build up inside a bullet proof vest or bomb suit, the soldier will have a high so-called "heat signature" in the other areas of the soldier's body where heat can be released. This uneven "heat signature" will allow that soldier to be easily located by an enemy's thermal imaging equipment. For the sake of survival in a high technology battlefield, it is better for the soldier to dissipate heat rapidly throughout his or her body and thereby have an even "heat signature."

Moreover, it is quite likely that a garment designed to be effective against one hazard will be ineffective against other hazards. For example, the prior art radiation protective garments will probably not be effective in stopping bullets. Conversely, the prior art bullet proof vests and bomb suits will not be effective in stopping radiation.

BRIEF SUMMARY OF THE INVENTION

The present invention is directed to articles, including fabrics and film layers, which can protect against multiple hazards, including radiation, chemical, biological agents, metal projectiles and fire hazards. In some embodiments, the fabrics and films of the present invention are used to produce garments with multiple hazard protection and superior heat dissipating properties. In other embodiments, the protective fabric or film can be used to produce a poncho, protective tent, nuclear detection probe, wallpaper, house siding, roofing material, composite house foundation or a liner for a commercial aircraft cabin, airport scanner, food irradiation machine or x-ray room. Further, the materials of the present invention can be incorporated into a paint or coating and applied to a wide variety of surfaces.

A radiation protective compound is preferably created by mixing a radiation protective material, such as barium, bismuth, tungsten or their compounds, with a powdered polymer, pelletized polymer or liquid solution, emulsion or suspension of a polymer in solvent or water. The polymer may advantageously be selected from a broad range of plastics including, but not limited to, polyurethane, polyamide, polyvinyl chloride, polyvinyl alcohol, natural latex, polyethylene, polypropylene, ethylene vinyl acetate and polyester. The radiation protective polymeric mixture is then preferably combined with one or more layers of fabric.

Other types of hazard protection can then be combined with the radiation protection. For example, the radiopaque polymer composite can be laminated onto one or more commercially available fabrics which provide protection against hazardous chemicals, biological agents, metal projectiles or fire. The commercially available fabrics include polyethylene fabrics such as DuPont's Tyvek®, polypropylene fabrics such as Kimberly-Clark's Kleenguard® or Kappler's Proshield®, plastic laminate fabrics such as DuPont's TyChem® or Kimberly Clark's HazardGard I®, microporous-film based fabrics such as DuPont's NexGen® or Kappler's Proshield 2®, carbon sphere composite fabrics such as Blucher GmbH's Saratoga™ and aramid fabrics such as DuPont's Kevlar® or Nomex®.

Alternatively, a film capable of providing protection against hazardous chemicals, biological agents, fire or metal projectiles can be laminated or otherwise adhered to a radiation protective fabric or film of the present invention. This additional film can be formed from a variety of polymeric materials, such as polyethylene, polypropylene, polyurethane, neoprene, polytetrafluoroethylene (Teflon®), Kapton™, Mylar™ or combinations thereof.

Where heat, humidity or a soldier's thermal signature is a concern, heat dissipating compounds, such as copper, silver, aluminum gold, beryllium, tungsten, magnesium, calcium, carbon, molybdenum, and/or zinc, can be added to the radiation protective polymeric mixture before it is applied to one or more layers of fabric. Alternatively, a polymeric, heat dissipation layer can be specially created and adhered to the radiation protective fabric.

The radiation protective fabric, either alone or in combination with other layers (e.g., chemically protective, heat dissipating), can be incorporated into a bullet proof vest or bomb suit. Typically, bullet proof vests and bomb suits are constructed with aramid and/or polyethylene fabric layers which are sewn together. To add radiation protection to such a bullet proof vest or bomb suit, a radiation protective fabric layer can be sewn between or laminated onto the aramid and/or polyethylene fiber layers. Chemical and biological protection can also be imparted by sewing in or laminating chemical protective films with the aramid and/or polyethylene bulletproof fabrics.

Using similar principles, known fire retardant fabrics, such as the aramid Nomex® or Kevlar® fabrics produced by DuPont, can be combined with the bullet proof, radiation protective, chemically resistant, biologically resistant and/or heat dissipating fabric layers of the present invention either by sewing or laminating to create a garment which provides protection against many forms of life threatening hazards. Such a garment can be characterized as a "universal" protective garment. The principles of the present invention can also be applied to a broad range of other articles, including surgical hoods, hospital gowns, gloves, patient drapes, ponchos, partitions, coverings, jumpsuits, uniforms, fatigues, tents, envelopes, pouches, wallpaper, liners, drywall, house sidings, house foundations, radiation probes etc. In addition, transparent items with radiopaque qualities, such as an impregnated eye shield, can be attached to or incorporated within the protective garments of the present invention.

BRIEF DESCRIPTION OF THE DRAWINGS

FIG. 18 shows a preferred process for producing a polymer film incorporating radiation protective materials.

FIG. 19 shows an alternative process for producing a polymer film incorporating radiation protective materials.

FIG. 20 shows an enhanced version of the FIG. 19 process which creates a film having multiple hazard protective properties.

DETAILED DESCRIPTION OF THE INVENTION

Figure 1:
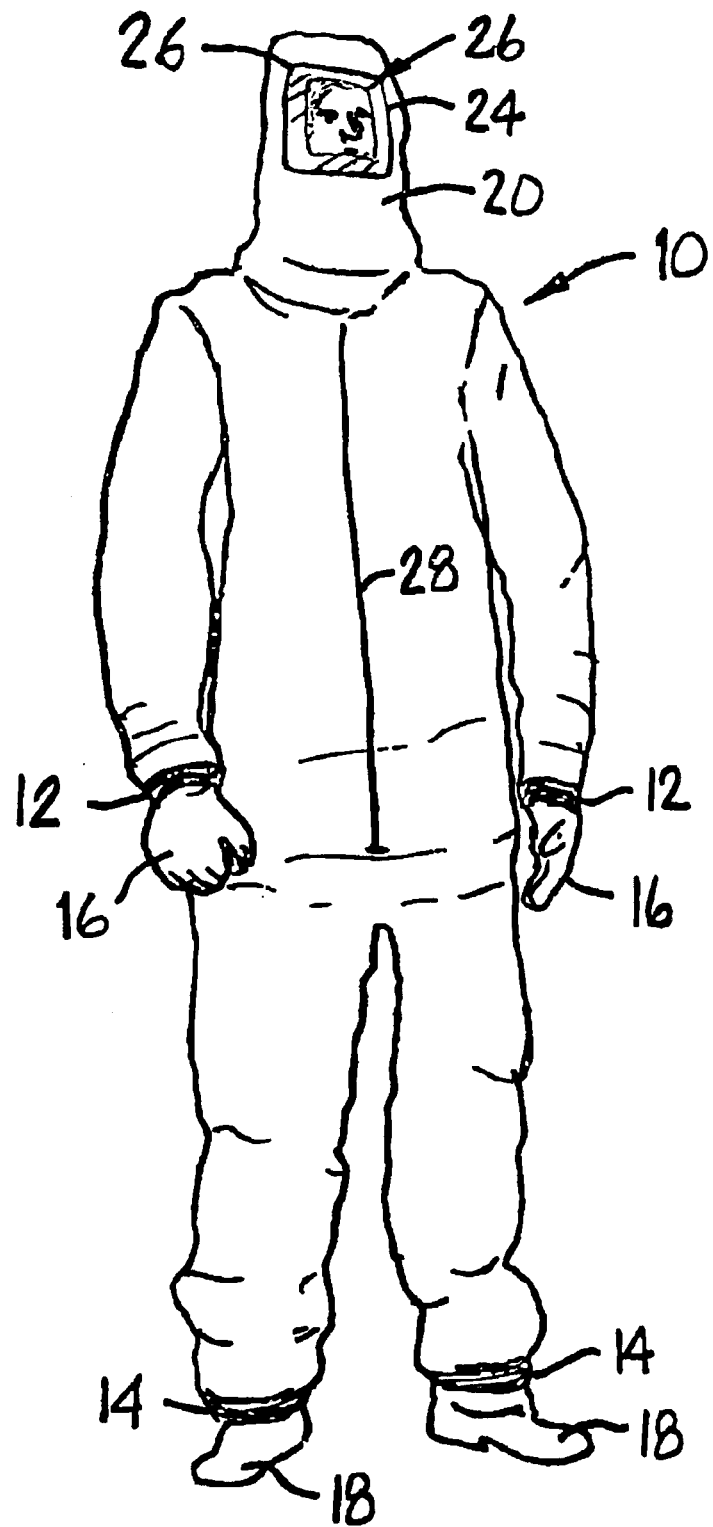
FIG. 1 shows a full body suit capable of protecting its user against one or more life threatening hazards.

FIG. 1 shows a full body suit 10 which is constructed from hazard protecting fabrics of the present invention. To provide complete surface protection, the full body suit 10 should preferably be a one-piece jumpsuit which covers every portion of the human body. Elastic bands 12, 14 can be used around the hand and foot areas to help insure a tight fit. Alternatively, the gloves 16, booties 18 and hood 20 can be separate pieces which overlap with the rest of the jumpsuit so as to leave no skin surface exposed. The full body suit 10 can also include hook and loop fasteners or a zipper flap 28 to allow the user to easily enter the full body suit 10.

A transparent eye shield 24 is preferably included with the full body suit 10 to provide protection for the face. For convenience, the eye shield 24 could be hinged, such as with corner rivets 26, in order to allow the user to flip the shield 24 up and down. Alternatively, the eye protection can be a stand alone device, such as safety glasses (not shown). To provide radiation protection, the eye shield 24 preferably incorporates lead or similar radiation protective glass.

Figure 2:
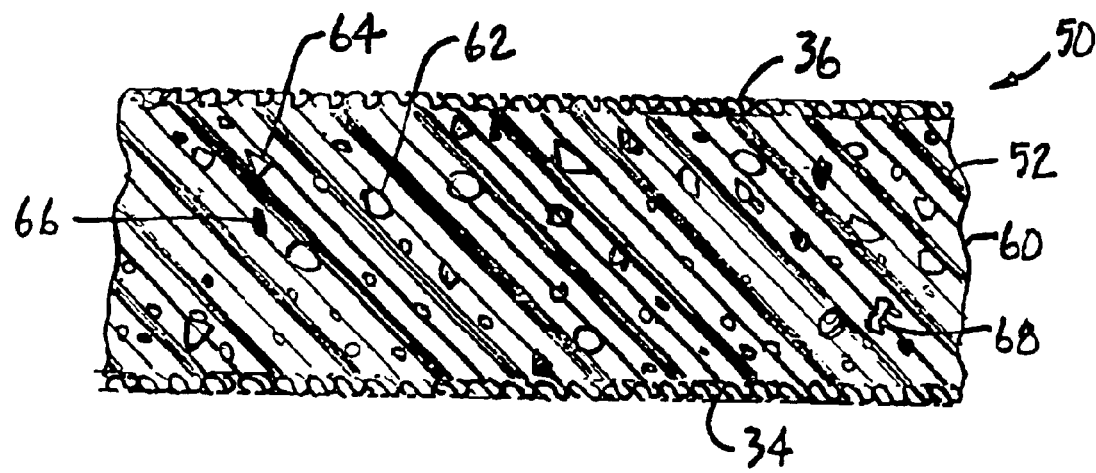
FIG. 2 shows a cross-section of a composite fabric having a central polymer layer with multiple forms of radiation protective material.

FIG. 2 shows a cross-section of a composite fabric 50 with an intermediate radiation protective polymeric layer 60 that can be used for the full body suit of FIG. 1 to provide radiation protection. In the FIG. 2 illustration, the intermediate polymeric layer 60, which includes radiation protective materials 62, 64, 66, 68 in addition to polymers 52, is sandwiched between two layers of fabric or other material 34, 36. The outside fabric or other material 34, 36 is preferably flat and pliable. It can be, for example, a non-woven, polymeric fabric, such as polypropylene, polyethylene, aramid fabric, rayon or any mixture of these. Alternatively, the outside fabric or other material can be a woven fabric, such as cloth, or can be another flat, pliable material, such as paper or film.

For the radiation protective materials, barium sulfate, tungsten and bismuth are preferred choices for the present invention because, as compared with lead, for example, they are lighter in weight, less expensive and have fewer known heath hazards. Other radiation protective materials can also be used, including, but are not limited to, barium, other barium compounds (e.g., barium chloride), tungsten compounds (e.g., tungsten carbide and tungsten oxide), bismuth compounds, tantalum, tantalum compounds, titanium, titanium compounds, Diatrizoate Meglumine Inj. USP (sold by Nycomed Corporation under the tradename HYPAQUE™), Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium. These radiopaque materials can be purchased from a variety of chemical supply companies, such as Fisher Scientific, P.O. Box 4829, Norcross, Ga. 30091 (Telephone: 1-800-766-7000), Aldrich Chemical Company, P.O. Box 2060, Milwaukee, Wis. (Telephone: 1-800-558-9160) and Sigma, P.O. Box 14508, St. Louis, Mo. 63178 (Telephone: 1-800-325-3010). To obtain the best protection against radiation, smaller particle sizes of the radiation protective materials, such as submicron sizes, are preferred. Nonetheless, the added cost of purchasing such small size particles must be weighed against the importance of the additional protection achieved. Those of skill in the art will readily recognize that other radiation protective materials incorporating the same metals can be used interchangeably with the ones listed.

In the radiation protective composite fabric 50 of FIG. 2, the radiation protective materials are embedded in a polymeric mixture 60. The polymeric mixture 60 preferably includes a polymer 52, one or more radiation protective materials 62, 64, 66, 68 and one or more additives. The polymer 52 may be selected from a broad range of plastics including, but not limited to, polyurethane, polyamide, polyvinyl chloride, polyvinyl alcohol, natural latex, polyethylene, polypropylene, ethylene vinyl acetate (EVA) and polyester. The additives are typically chemicals to improve the flexibility, strength, durability or other properties of the end product and/or to help insure that the polymeric mixture has an appropriate uniformity and consistency. These additives might be, in appropriate cases, plasticizers (e.g., epoxy soybean oil, ethylene glycol, propylene glycol, etc.), emulsifiers, surfactants, suspension agents, leveling agents, drying promoters, flow enhancers etc. Those skilled in the plastic processing arts are familiar with the selection and use of such additives.

The proportions of these various polymeric mixture ingredients can vary. Using a greater proportion of radiation protective materials will generally impart greater radiation protection. Nonetheless, if the proportion of radiation protective materials is too high, the polymeric mixture will become brittle when dried or cooled and easily crumble apart. The inventors have found from their work that over 50% of the polymeric mixture, by weight, can be barium sulfate, tungsten, bismuth or other radiation protective materials, with most of the rest of the mixture consisting of the polymer.

For their commercial DEMRON™ radiation protective compound, fabric and full body suit sold by Radiation Shield Technologies, Inc. of Miami, Fla., the inventors typically use a polymeric mixture for their radiation protective compound containing approximately 85% by weight of radiation protective materials and approximately 15% by weight of polymer. The currently preferred combination of radiation protective materials used in the DEMRON™ polymeric mixture are tungsten (75%), barium sulfate (20%) and bismuth (5%). The currently preferred polymers used in the DEMRON™ polymeric mixture are ethyl vinyl acetate (EVA) and polyethylene. The currently preferred outside fabric layers used for DEMRON™ are a woven cloth and a non-woven fabric, such as DuPont's Tyvek® and TyChem® flashspun polyethylene fabrics. Using the Tyvek® and/or TyChem® fabrics for DEMRON® has the advantage of adding chemical and biological protection properties to DEMRON'S® radiation protection properties.

Like the inventors' commercial DEMRON® product, the intermediate polymeric layer 60 illustrated in FIG. 2 includes several types of radiation protective materials 62, 64, 66, 68. These radiation protective materials 62, 64, 66, 68 can be, for example, a barium compound 62, a tungsten compound 64, a bismuth compound 66 and an iodine compound 68. By using a plurality of different radiation protective material, the radiation protective article can be more effective in blocking different forms of radiation than a similar article with a single radiation protective material. For example, some radiation protective materials might be more effective in blocking beta particles, while others will be more effective in blocking gamma rays. By using both types of radiation protective materials in the radiation protective fabric or other material of the present invention, the article will have a greater ability to block both beta particles and gamma rays.

In this regard, it may be appropriate to consider the use of lead as one of the radiation protective materials for such a hybrid application, or even more generally, for the type of plasticized articles disclosed herein. While, because of its potential health hazards, lead would not be as preferred as the other radiation protective materials previously listed, lead nonetheless might have a role in a plasticized radiation protective mixture or in certain other plastic film applications.

Figure 3:
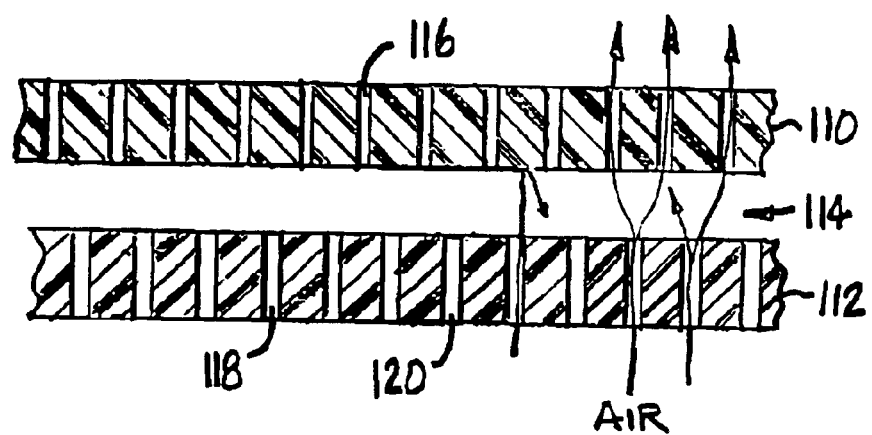
FIG. 3 shows a cross-section of a two layer radiation protective composite fabric which illustrates how the fabric can be made both breathable and radiation protective.

In applications where it is important that a radiation protective garment or article have breathability, such as for a surgical mask or where a full body suit is being used in a particularly hot and humid environment, two radiation protective layers 110, 112 of the type previously described can be perforated and staggered as illustrated in FIG. 3. As shown in FIG. 3, the two radiation protective layers 110, 112 are separated by a gap 114. To prevent the gap 114 from collapsing, the gap 114 can be filled with a very porous woven or nonwoven fabric, such as cloth (not shown). Both of the two radiation protective layers 110, 112 have been perforated to create patterns of holes 116, 118, 120. By offsetting the holes 116, 118, 120 in the two sheets 110, 112 as shown in FIG. 3, radioactive particles, which travel in an essentially straight line, would be blocked by at least one of the two layers, while air, which can bend around obstructions, will still be allowed to pass through.

In the same vein, the radiation protective materials previously described or aluminum, could be formed into fibers and woven into a garment or interwoven with conventional garment material, such as cloth, to provide both the flexibility of a cloth garment and the radiation protection of metallic lead garment. The radiation protective material can also be incorporated within a variety of clear plastics or glass to create, for example, a clear eye shield 24 of the type shown in FIG. 1 having radiopaque qualities. In another alternative embodiment, perforated or unperforated sheets of pure radiation protective materials, such as aluminum, can be inserted into an article to impart radiopaque qualities.

Figure 4:
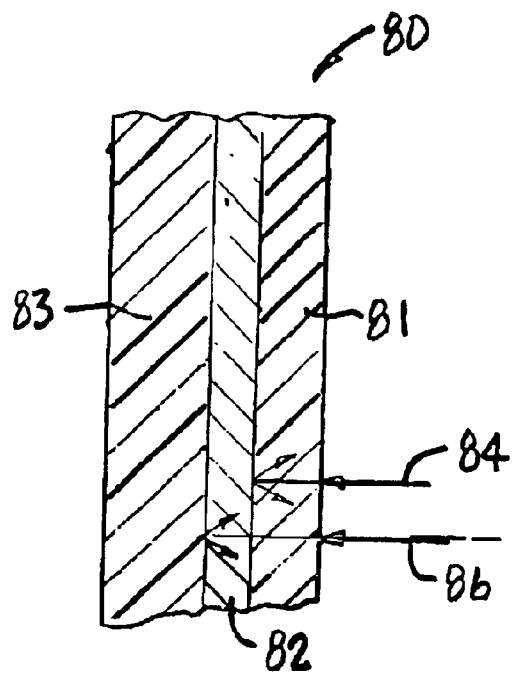
FIG. 4 shows a cross-section of a multiple layer radiation protective article which provides enhanced radiation protection.

FIG. 4 shows a second approach to enhancing radiation protection through a particular multi-layer construction 80. Each of the layers 81, 82, 83 of this multi-layer product 80 have different thicknesses. While a layer of one thickness 81 might be capable of stopping radiation 84 with certain wave characteristics, it might allow radiation of different wave characteristics 86 to pass right through. Nonetheless, by backing up the first layer 81 with additional layers of different thicknesses, there is a greater chance of stopping different types of radiation, regardless of their wave characteristics. As a further example, the layers 81, 82, 83 might be constructed with different radiation protective materials. For example, the barium, tungsten and/or bismuth radiation protective materials have been found by the inventors to provide cost effective protection against alpha and beta particles, but not as much protection against neutrons. To provide better protection against neutrons, the inventors have found films with tightly packed boron and/or beryllium radiation protective materials to be most effective. Such a boron and/or beryllium film might advantageously have approximately 50% by weight of radiation protective materials and approximately 50% by weight of polymer and additives. To provide cost effective protection against alpha, beta and neutron particles, an effective approach would be to combine a polymeric layer with barium, tungsten and/or bismuth compounds 81 with a polymeric layer having boron and/or beryllium compounds 82. As those in the art will recognize, a synergistic effect might also be achieved by combining the different radiation protective materials 62, 64, 66, 68 as shown in FIG. 2 with the use of layers of different thicknesses 81, 82, 83 as shown in FIG. 4 in order to create a radiation protective article that offers the maximum amount of radiation protection for a given weight and thickness.

Figure 5A:
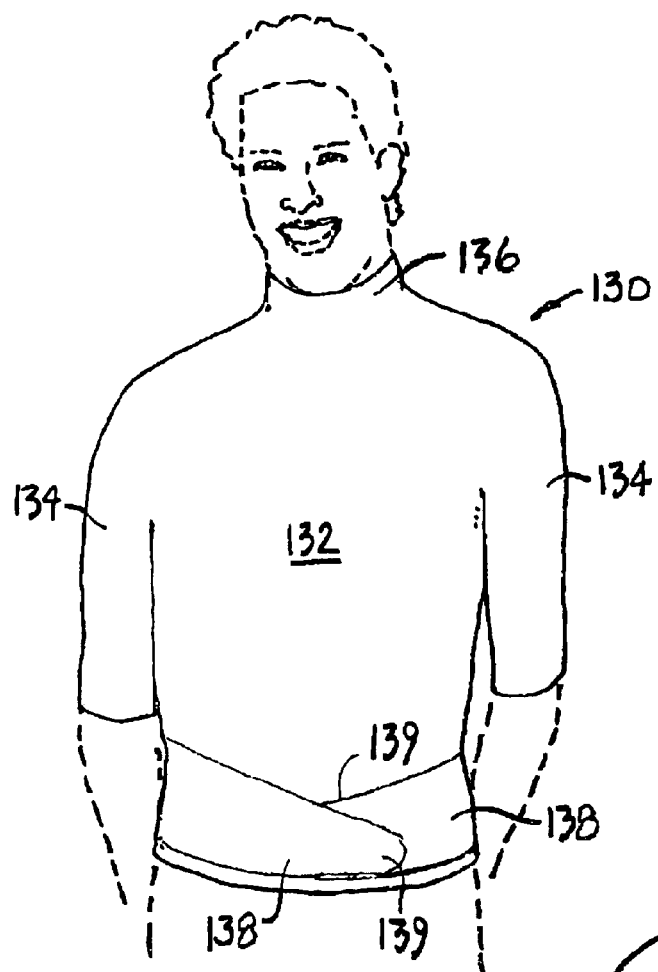
FIG. 5A shows the front view of medical apron capable of protecting its user against one or more life threatening hazards.
Figure 5B:
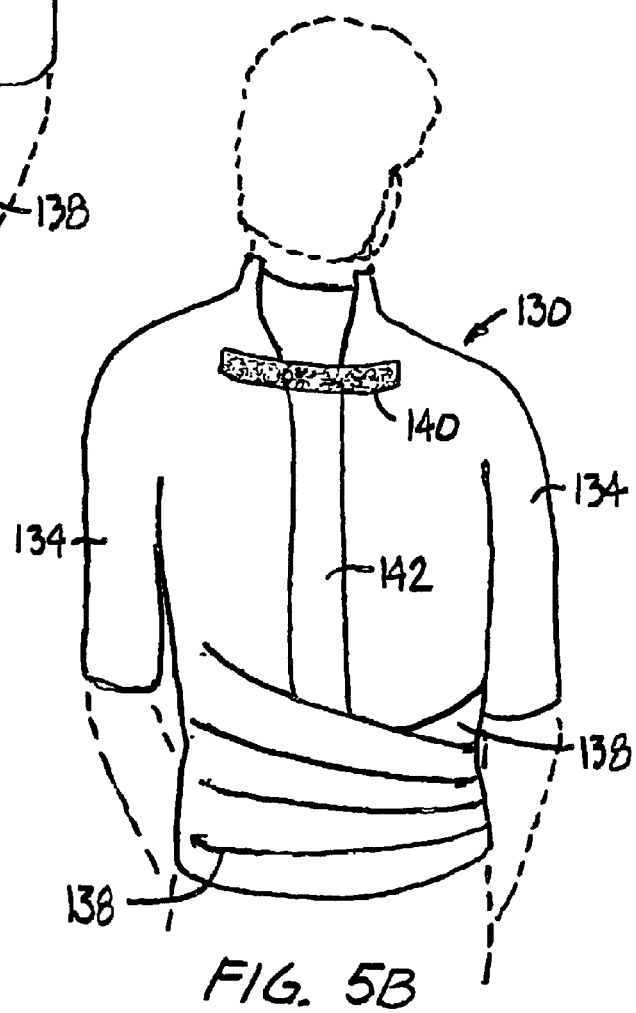
FIG. 5B show the rear view of the medical apron of FIG. 5A.
Figure 6:
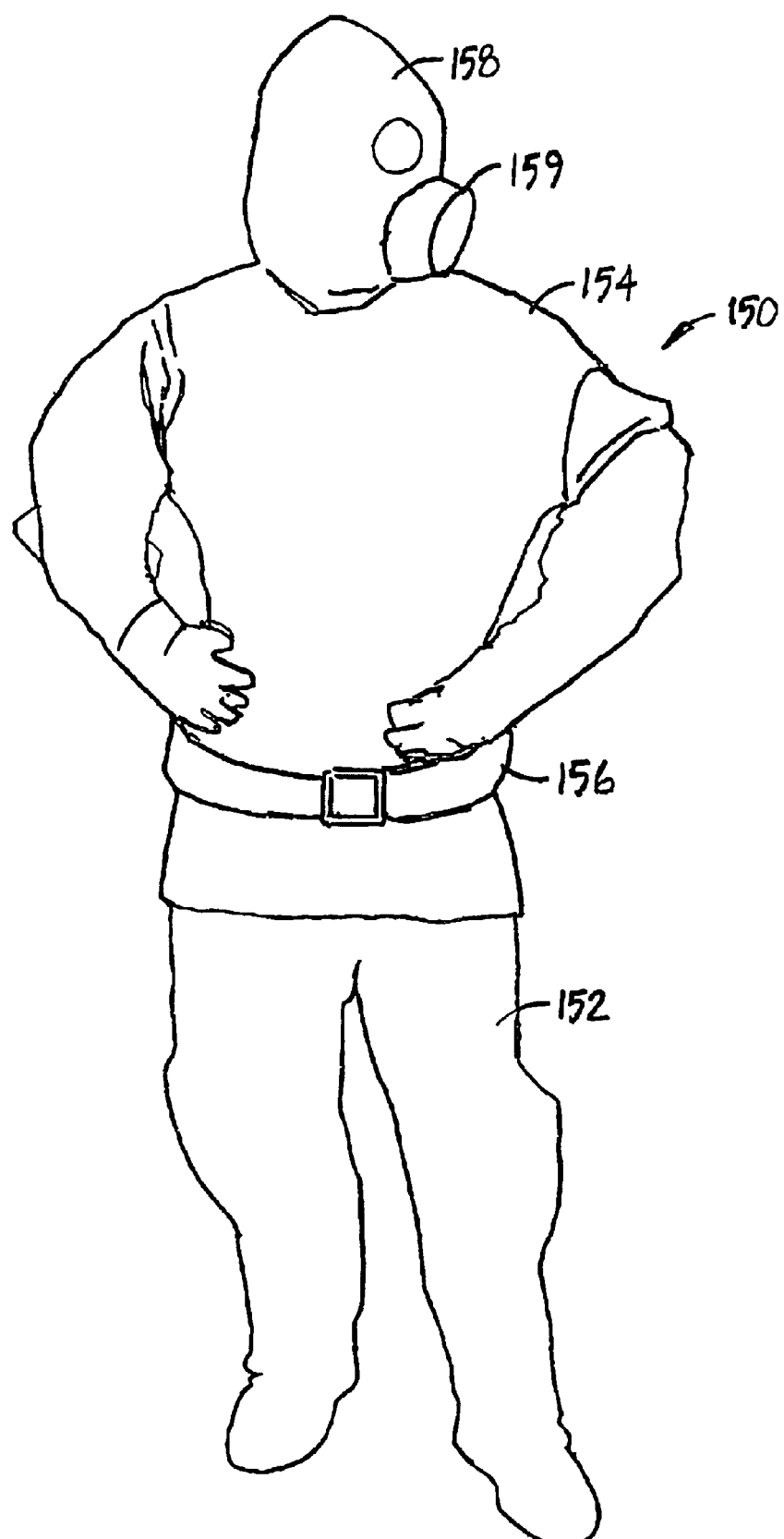
FIG. 6 shows a two piece suit capable of protecting its user against one or more life threatening hazards.

FIGS. 5A, 5B and 6 show that a wide variety of garments can be formed from the hazard protecting films and fabrics of the present invention and are not limited to the full body suit 10 shown in FIG. 1. FIG. 5A, for example, shows the front view of a medical apron 130 which is constructed from the hazard protective films and/or fabrics of the present invention. The illustrated apron 130 covers the chest 132, upper arms 134 and neck 136 of the user with a hazard protecting film or fabric, such as the radiation protective fabric previously discussed. As those in the art will readily appreciate, more or less of the body surface can be covered by this apron 130 in order to provide the desired level of protection. Wrap around straps 138 are constructed at the lower waist portion of the apron 130 to allow the apron 130 to be firmly secured to the user's body. These wrap around straps 138 might advantageously include hook and loop fasteners (not shown) to firmly hold the strap ends 139 together.

FIG. 5B provides a rear view of the FIG. 5A medical apron 130. This rear view hows how the wrap around straps 138 are crossed in the back so that the ends 139 can meet at the front of the apron 130. This rear view also shows upper body connecting strap 140 which keeps the apron fitting tightly to the user's upper torso. Again, hook and loop fasteners (not shown) can advantageously be used to removably fasten at least one end of the upper body connecting strap 140 to the medical apron 130. In the FIG. 5B illustration, an open area 142 is left in the back of the medical apron 130 so that all the apron fits more easily to the user's body. This area 142 is left open on the assumption that the user's front and sides will be exposed to the hazard, rather than the user's back. Of course, if the user's back is at risk, this area 142 should not be left open.

FIG. 6 shows that the hazard protecting films and fabrics of the present invention can be formed into a two piece suit 150. This two piece suit includes pants 152, jacket 154 and hood 158 constructed out of the hazard protecting films and fabrics of the present invention. A belt 156 can be used to hold the jacket 154 tightly against the pants 152. Also, a gas mask 159 can be used to provide protection against inhalation of hazardous gases. As compared with the full body suit 10 shown in FIG. 1, this two piece suit 150 is advantageous for military applications where flexibility is needed. For example, on a hot day, a soldier may only want to wear the pants 152 and belt 156 in order to keep cool, while having the jacket 154, hood 158 and gas mask 159 are kept nearby in case a chemical, radiation or biological threat becomes imminent.

Figure 7:
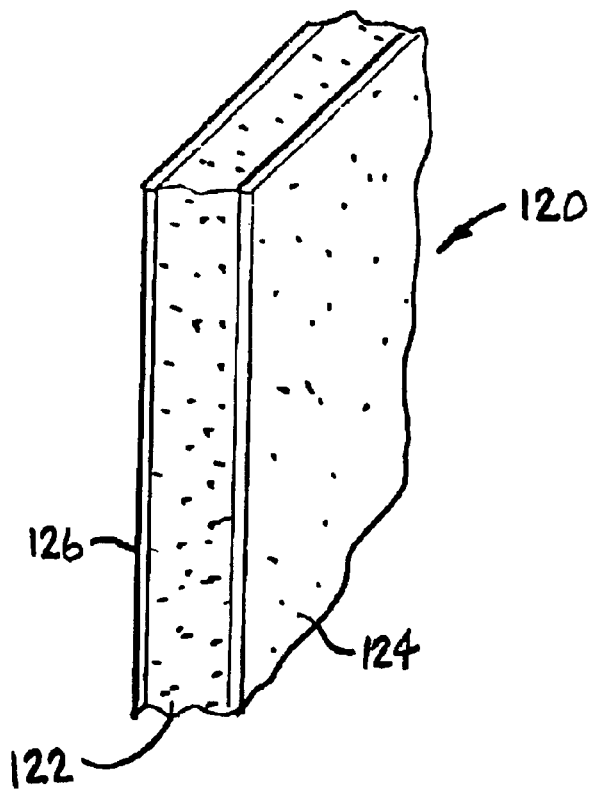
FIG. 7 shows a cross-section of a radiation protective drywall incorporating the radiation protective materials of the present invention.

FIGS. 7–10 illustrate that the hazard protecting materials of the present invention are not limited in their usefulness to fabrics and garments. FIG. 7 illustrates, for example, how radiation protective materials can be incorporated into common drywall 120. In this case, the radiation protective materials of the present invention, such as barium sulfate, tungsten or bismuth, can be mixed with the gypsum commonly used in drywall and then inserted 122 between two layers of cardboard 124, 126.

Figure 8:
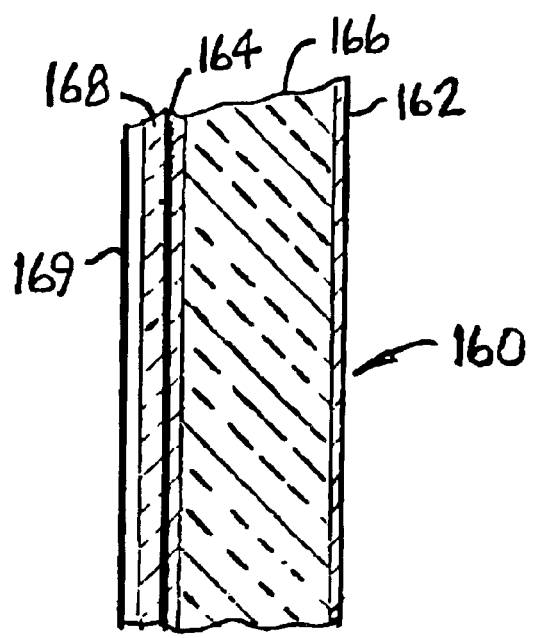
FIG. 8 shows a wall cross-section which incorporates radiation protective materials of the present invention.
Figure 9:
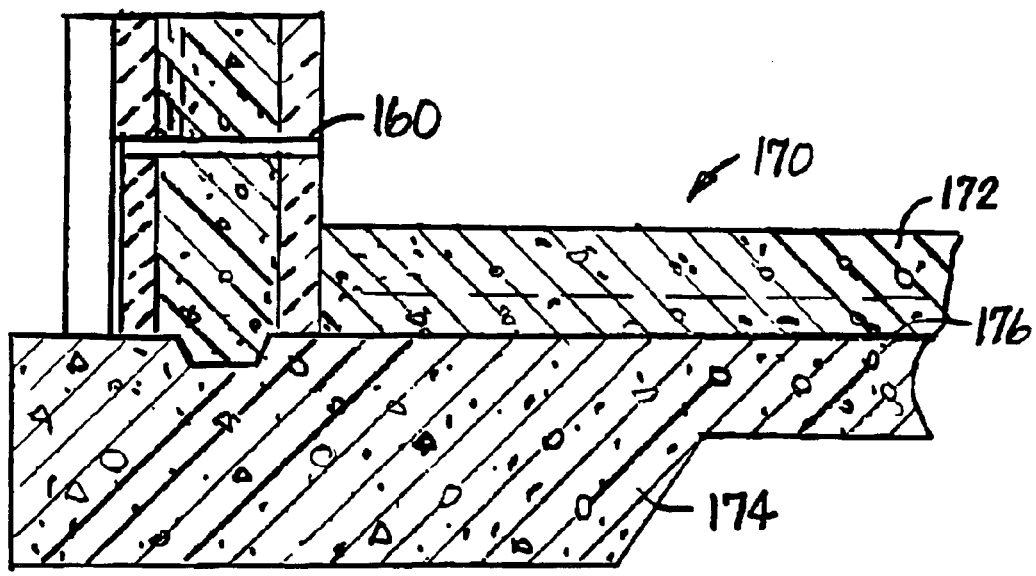
FIG. 9 shows a foundation cross-section which incorporates radiation protective materials of the present invention.

FIGS. 8 and 9 illustrate how the hazard protecting materials of the present invention can also be used on other construction applications. FIG. 8, for example, shows a cross-section of the type of wall 160 which might be used for a house or other building. This wall 160 might include drywall 162, insulation 166, exterior sheathing 164, exterior drainage paper 168 and housing wrap 169. The hazard protections of the present invention can be incorporated into any and all of these wall layers. Incorporation of radiation protection into common drywall has already been discussed in connection with FIG. 7. Radiation protective materials, such as barium sulfate, tungsten or bismuth, can also be mixed into or spray adhered to insulation materials 166. The housing wrap 169 used in construction is often a polymeric film such as DuPont's Tyvek®. As previously described for the inventors' DEMRON™ fabric, radiation protection can be added to a flashspun polyethylene Tyvek® type fabric by laminating a radiation protective polymeric mixture on to the Tyvek® type fabric. Using a similar lamination or other adherence technique, radiation protection can be added to the materials commonly used for exterior sheathing 164 and exterior drainage paper 168.

FIG. 9 illustrates how hazard protection can be added to the foundation 170 of a house or other building. Such a foundation may consist of reinforced concrete 174 upon which floorboards 172 and the house's or building's wall 160 stand. To impart radiation protection against, for example, the radon which seeps upwards from below ground, radiation protective materials, such as barium sulfate, tungsten compounds or bismuth compounds, can be mixed into the reinforced concrete 174 used in the foundation 170. Alternatively, a layer of film or fabric 176 of the present invention can be inserted between the reinforced concrete 174 and floorboards 172 of the foundation 170. These same principles can be used to protect the roof (not shown) of a house or building from being penetrated by solar radiation. In the case of a roof, radiation protective materials can either be mixed into the exterior roofing material (e.g., ceramic tiles), laminated onto the exterior roofing material (e.g., shingles) and/or a hazard protecting film or fabric 176 of the type shown in FIG. 9 can be inserted between the exterior roofing material and the internal roofing structure.

Figure 10:
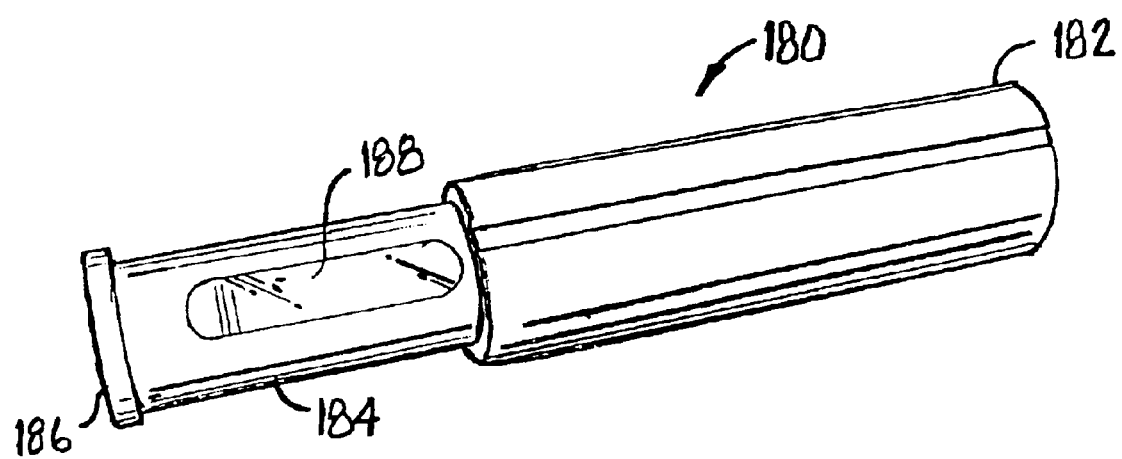
FIG. 10 is a perspective view of a probe which incorporates radiation protective materials of the present invention.

FIG. 10 illustrates how the composite radiation protective compounds of the present invention can be used to create injection molded objects. The injection molded object illustrated in FIG. 10 is a radiation measuring probe 180 which can be inserted into the earth and used to help find deposits of radioactive materials. This radiation measuring probe 180 includes a slidable outer sleeve 182, an inner housing 184, a detection window 188 and a flange 186 which is used as a stop for the slidable outer sleeve 182. Up to now, the problem with such radiation measuring probes is that they let in so much extraneous radiation through the outer sleeve 182 and inner housing 184 that it is difficult to get a reliable reading of whether the detected radiation is coming from the direction of the detection window 188. To overcome this problem, the outer sleeve 182, inner housing 184 and flange 186 can be constructed from the type of polymeric mixture incorporating radiation protective materials which has previously been described. As before, adding a greater proportion of radiation protective materials to the mixture will generally impart greater radiation protection but, if the proportion of radiation protective materials is too high, the polymeric mixture will become brittle when dried or cooled and easily crumble apart. As such, the proportions of polymer and radiation protective materials should be selected to create a sturdy probe when produced through an injection molding process which would otherwise have a sufficient amount of radiation protective materials to block background radiation. By using the radiation protective polymeric mixtures of the present invention in the radiation measuring probe 180 of FIG. 10, the detected radiation can be attributed with much more certainty to the radiation passing through the window 188 than any radiation passing through the remainder of the probe 180.

Figure 11:
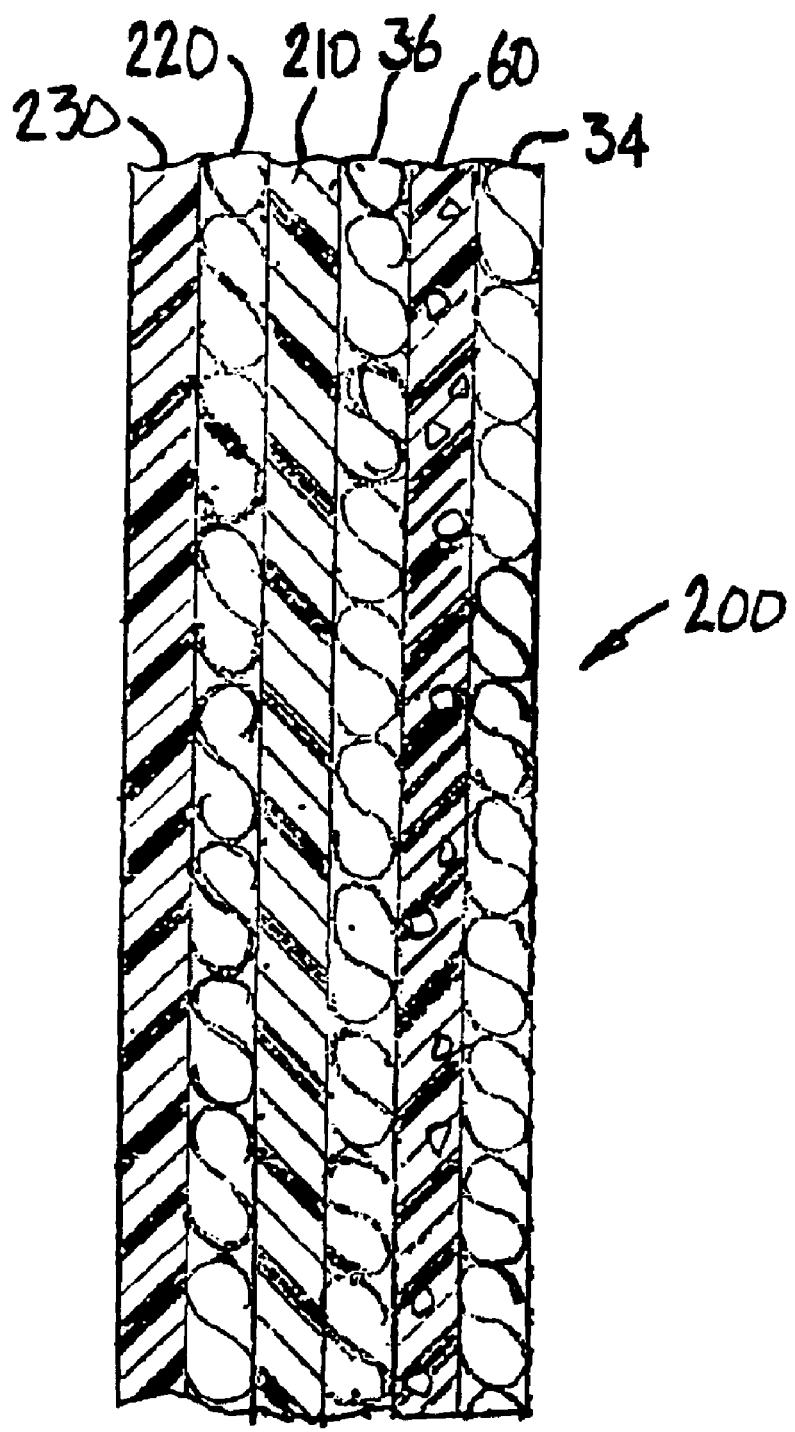
FIG. 11 shows a cross-section of a six layer fabric which provides multiple forms of hazard protection.

Turning to FIG. 11, a composite fabric cross-section 200 is illustrated which can provide protection against life threatening hazards in addition to that posed by radiation, such as toxic chemicals, infectious biological agents, fire and metal projectile hazards. As part of this multiple hazard protection composite fabric, there are the previously mentioned three layers of composite fabric with a radiation protective polymer mixture 34, 36, 60 (see, FIG. 2). Added to these three layers 34, 36, 60 are additional layers 210, 220, 230 which can protect against different hazards. For example, a nonporous chemical protective layer 210 and/or 220 can be added to the three radiation protective layers 34, 36, 60. This nonporous chemical layer can either be polymer film 210 which is laminated onto the three radiation protective layers 34, 36, 60 and/or a chemical protective fabric 220 which is sewn or otherwise adhered onto the three radiation protective layers.

This chemical protective layer 210, 220 can be constructed of known chemical protective polymers and/or fabrics. For example, one known class of chemically protective fabrics are non-woven textiles, such as the flashspun polyethylene fabric sold by DuPont under the tradename Tyvek®), polypropylene fabrics such as Kimberly-Clark's Kleenguard™, Kappler's Proshield 1™, Lakeland's Safeguard 76™, fabrics mixing polyethylene with polypropylene and cellulose based fabrics such as DuPont's Sontara™ and Kimberly Clark's Prevail™. A similar type of non-woven textile would be the class of plastic films laminated onto one or both sides of a nonwoven fabric including DuPont's TyChem® series of fabrics, Kimberly Clark's HazardGard I, II™ fabrics, Kappler's CPF™ and Responder series of fabrics and ILC Dover's Ready 1 fabric™. These nonwoven textiles would typically be combined with the three radiation protective layers 34, 36, 60 by sewing or otherwise adhering the fabrics together.

Chemical protection can also be imparted by using polyvinyl chloride and/or chlorinated polyethylene films, such as ILC Dover's Chemturion™. These films could be laminated or extruded onto the three radiation protective layers 34, 36, 60 of the present invention.

Another class of chemical protective layers are polymer films with microscopic pores laminated onto fabric such as Gore-tax® or polypropylene based fabrics such as DuPont's NexGen™, Kimberly Clark's Kleenguard Ultra™, Lakeland's Micro-Max™ and Kappler's Proshield 2™. Chemical protection can further be provided by materials incorporating an absorbent layer, such as the carbon/fabric combinations sold by Blucher GmbH and Lanx. Another class of chemically protective fabrics are woven fabrics coated with rubber or plastic on one or both sides. These coated chemically protective fabrics include polyvinyl chloride and nylon composites, polyurethane/nylon composites, neoprene/aramid composites, butyl/nylon composites, chlorinated polyethylene/nylon composites, polytetrafluoroethylene (i.e., Teflon®)/fiberglass composites and chlorobutyl/aramid composites.

Because the chemical protective layer 210, 220 is preferably nonporous, it will also provide protection against infectious biological agents.

While the fabric shown in FIG. 11 can provide a broad measure of protection with only the addition of a chemical protective layer 210, 220 to the three radiation protective layers 34, 36, 60, further or alternative layers 210, 220, 230 can nonetheless also be chosen to protect against additional hazards or promote heat dissipation. For example, where the chemically protective layer 210 is a plastic laminate, layer 220 in FIG. 11 could be another woven or nonwoven fabric layer and layer 230 could be a fire protection layer, such as a layer produced from the Nomex® fire resistant aramid fabric manufactured by DuPont. Other types of fire resistant materials include combinations of the Nomex® and Kevlar® aramid fabrics such as that sold by Southern Mills, combinations of melamine resin with aramid fibers, combinations of polytetrafluoroethylene (i.e., Teflon®) with aramid fibers, combinations of rayon with aramid fibers, combinations of polybenzimidazole with aramid fibers, combinations of polyphenylenebenzobisoxazole with aramid fibers, combinations of polyimide with aramid fibers and Mylar™ plastic films. Alternatively, layer 230 could be a bullet or shrapnel resistant layer produced from bullet stopping aramid and/or polyethylene fibers.

It may alternatively be prudent to form layer 230 of a heat dissipation material. One way of forming such a heat dissipation layer is to mix compounds with high thermal conductivity, such as silver, copper, gold, aluminum, beryllium, calcium, tungsten, magnesium, zinc, iron, nickel, molybdenum, carbon and/or tin, with a polymer in the same way that the radiation protective materials are mixed with polymers to form radiation protective layer 60.

While a six layer hazard protecting fabric 200 is illustrated in FIG. 11, those of skill in the art will readily recognize that a multiple hazard protecting fabric can be created with more or less than six layers. For example, the woven or non-woven fabric layers 34, 36, 220 illustrated in FIG. 11 can be omitted. It is also possible to combine different hazard protecting or heat dissipating layers together into a single layer. For example, while the radiation protective layer 60 of the present invention has been found to provide superior heat dissipating properties on its own, these heat dissipating properties can be enhanced by adding strong thermal conductors, such as silver, copper and/or aluminum, to the mixture of radiopaque materials in the radiation protective layer 60.

Figure 12:
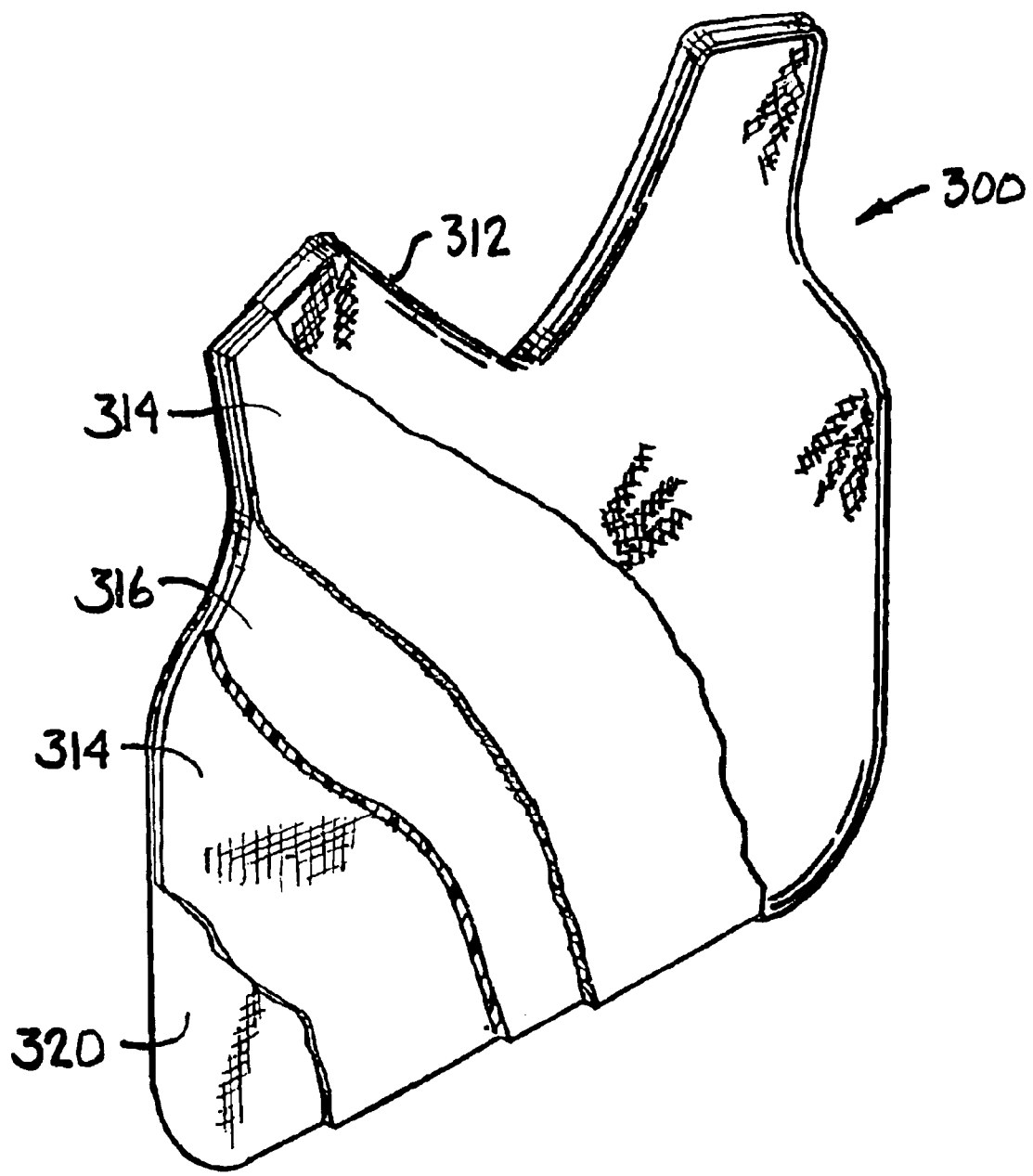
FIG. 12 shows a bullet proof vest which incorporates radiation protective films or other protective fabrics of the present invention.

Turning now to FIG. 12, a bullet proof vest 300 is illustrated which has additional hazard protecting properties. Most of the bullet proof vest 300 is of conventional design, similar to that shown in Borgese's U.S. Pat. No. 4,989,266, the disclosure of which is hereby incorporated by reference.

The bullet proof protection is primarily provided by layers of polyethylene fibers 314 and/or aramid fibers 316. Commercially available polyethylene fabrics used for bulletproof vests include Honeywell's Spectra™ series of ultra high molecular weight polyethylene fabrics and Honeywell's Spectraguard™ ultra high molecular weight polyethylene fabrics which also include fiberglass. Commercially available aramid fabrics used in bulletproof vests include DuPont's Kevlar® series of aramid fabrics and Akzo's Twaron™ series of aramid fabrics. In this preferred example, the bullet proof vest has one or more layers of aramid fibers 316 sandwiched between layers of polyethylene fibers 314. To obtain greater levels of protection against bullets and shrapnel, one typically creates a greater number of layers of aramid fibers 314 and/or polyethylene fibers 316. Additional strength can be created by laying plies of the bulletproof material at 90 degree orientations to one another and encapsulating them between layers of thermoplastic. Ceramics and plates can be added to provide even higher levels of protection. The bullet proof vest 300 shown in FIG. 7 is preferably held together by a fabric insert casing 312.

To add additional hazard protection to the bullet proof vest 300 shown in FIG. 12, an additional layer 320 of the type illustrated in FIGS. 2, 4 or 11 can be inserted. This additional layer 320 can, in one embodiment, be a composite radiation protecting layer 50, 80 of the type shown in FIGS. 2 and 4. By adding such a radiation protecting layer 50, 80 to the bullet proof vest, the bullet proof vest would achieve protection against radiation as well as bullets and shrapnel. Similarly, one could impart fire, chemical and/or biological protection by using a multiple layer fabric of the type described in connection with FIG. 11. In the case of radiation protection alone, one would usually want the added layer 320 to be situated close to the user's body in order to take advantage of the superior heat dissipation properties of the radiation protective layer 50, 80 of the present invention. By contrast, in the case of a fabric imparting fire, chemical and/or biological protection, one would typically want that layer near the outside of the bullet proof vest in order to prevent those contaminants from permeating into the bullet proof vest 300.

Figure 13:
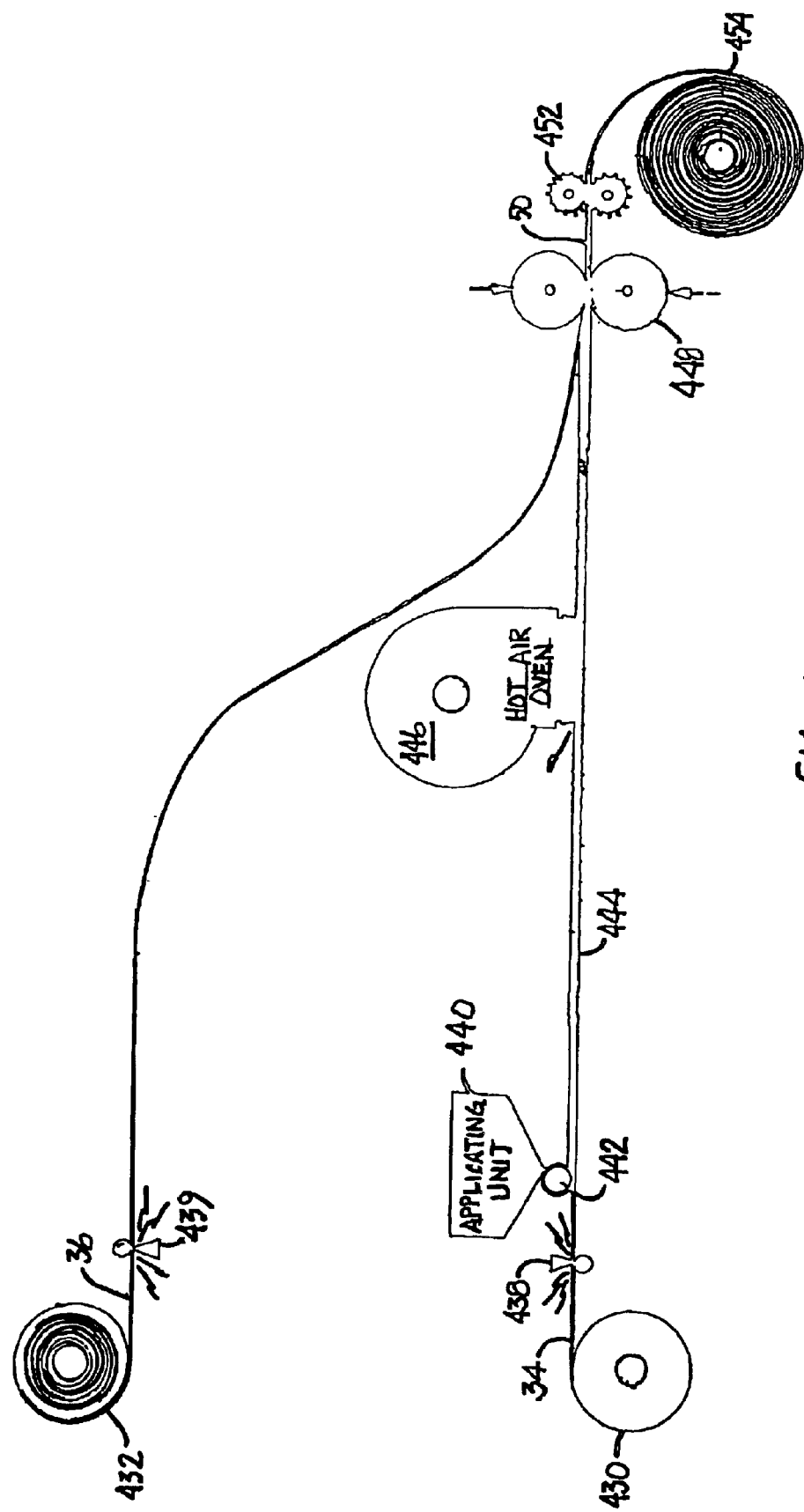
FIG. 13 shows a preferred process for forming a radiation protective fabric or other material by applying a liquid polymer incorporating a radiation protective material between two sheets.

FIGS. 13–20 illustrate different manufacturing techniques which can advantageously be used to create hazard protective fabrics of the present invention. FIG. 13, for example, illustrates a manufacturing technique that is particularly suited for mass production of radiopaque fabrics or other flat, pliable materials of the type illustrated in FIG. 2 for use in garments and other articles. The FIG. 13 process begins with one or more rolls 430, 432 of fabric or other flat, pliable material 34, 36 to which the polymer mixture will be applied. A non-woven, polymeric fabric, such as polypropylene, polyethylene, aramid, rayon or any mixture of these is preferred for this process because these polymeric fabrics have been found to bind well with the liquid polymeric mixture and, in some cases, provide inherent hazard protections. Alternatively, this process may also be accomplished using woven fabrics, such as cloth, and other flat, pliable materials, such as paper or films. To enhance the ability of the fabric or other material 34, 36 to bind with the polymer mixture, a corona treatment may be applied to the fabric or other material by one or more corona treaters 438, 439.

In this process, the radiation protective liquid polymer mixture is applied to one side of the unwound fabric or other material 34 through the use of an applicating unit 440. This applicating unit 440 would typically have a roller 442 to roll a thin layer (e.g., preferably 0.1–20 millimeters in thickness)

of the liquid polymeric mixture onto one side of an unwound fabric or other material 34.

After the applicating unit 440, the polymerized fabric 444 is then preferably passed through a hot air oven 446 to partially dry the thin layer of polymeric mixture before it is sent into a laminating unit 448. At the laminating unit 448, the coated fabric 444 is preferably combined under heat and pressure with a second sheet of fabric or other material 36 to create a sandwich-like radiation protective fabric 50. The sandwich-like radiation protective fabric or other material can then be perforated and/or embossed, as desired, in a perforating/embossing unit 452. Typically, the finished radiation protective product will then be wound into a final roll 454 to be shipped to a suitable location for use in fabricating garments or other articles. While two layers of fabric or other material 34, 36 have been shown in this FIG. 4 example, one could alternatively apply the polymeric mixture to a single sheet of fabric or other material 34 (i.e., like an open faced sandwich).

Figure 14:
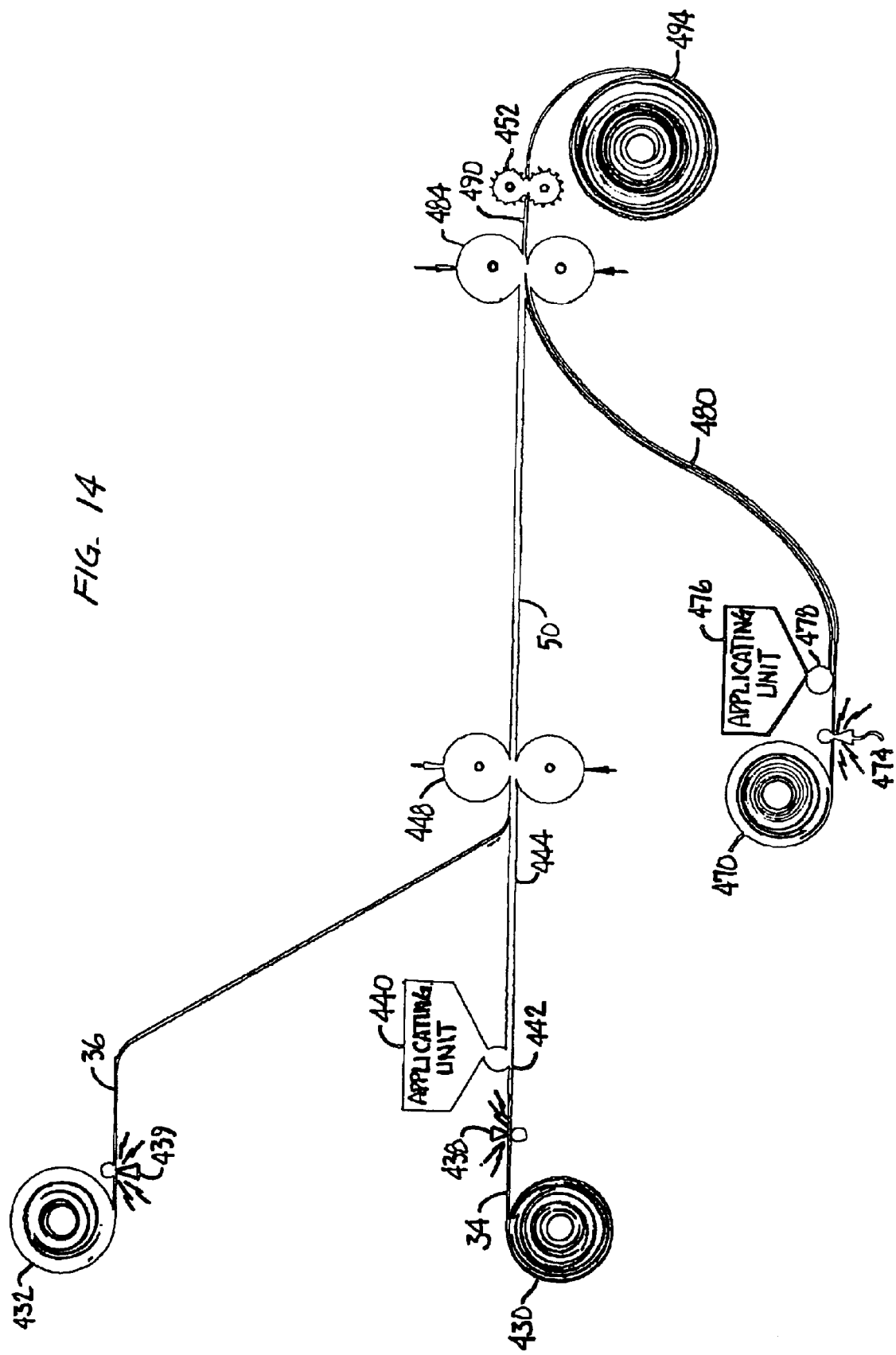
FIG. 14 is an enhanced version of the process shown in FIG. 13 which creates an additional hazard protection layer.

FIG. 14 shows an enhanced version of the process illustrated in FIG. 13 which can create a fabric with multiple hazard protections. Like FIG. 13, the two rolls of fabric 430, 432 and applicating unit 440 can be used to create a sandwich-like radiation protective fabric of the type shown in FIG. 2. To add protection from bullets or shrapnel, the two rolls of fabric 430, 432 can be rolls of bullet protecting aramid and/or polyethylene fiber fabrics. To impart additional types of protection, a third fabric roll 470 and a second applicating unit 476 can be added to the process. The fabric in roll 470 would typically be of the same woven, non-woven or bullet resistant fabric as rolls 430, 432. The second applicating unit 476 should then preferably impart a liquid polymeric mixture with a different, non-radiation type of hazard protection, such as a chemical, biological or fire protection. Alternatively, the liquid polymeric mixture from second applicating unit 476 could deposit a heat dissipating layer having strong thermal conductors, such as silver, copper or aluminum, being imbedded in a polymeric mixture.

At laminating unit 484, the sandwich-like radiation protective fabric is combined with the additional layer 480 of hazard protecting fabric to create a composite fabric 490 having multiple forms of hazard protection. The composite fabric 490 can then be perforated and/or embossed, as desired, in a perforating/embossing unit 452 and then wound into final roll 494. Nonetheless, where the additional layer imparts chemical and/or biological protection, this perforating/embossing step should be avoided.

Figure 15:
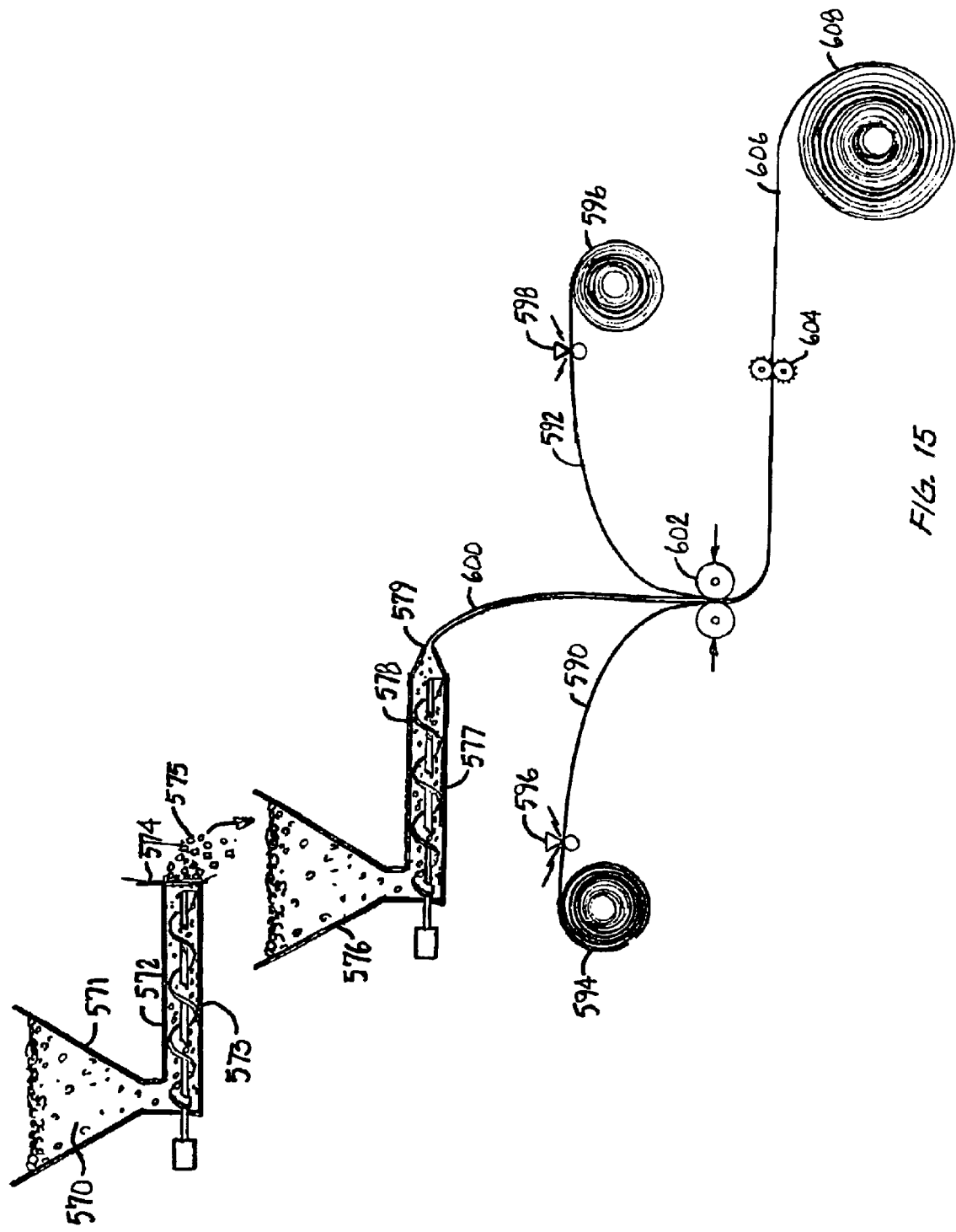
FIG. 15 shows a second process for forming a radiation protective fabric or other material by applying a liquid polymer incorporating a radiation protective material between two sheets.

Turning now to FIG. 15, a second general type of process for manufacturing hazard protecting fabrics of the present invention is shown. In the FIG. 15 process, the polymeric mixture ingredients 570 are placed into the hopper 571 of a first extruder 572. To achieve radiation protection, the polymeric mixture 570 preferably includes a polymer, one or more radiopaque materials and one or more additives. In this process, these polymeric mixture ingredients 570 can enter the hopper 571 in a solid form. As the hopper 571 feeds the polymeric mixture ingredients 570 into the first extruder 572, the polymeric mixture ingredients are preferably heated into a viscous liquid state and mixed together through the turning action of the motorized extruder screw 573. As this motorized extruder screw 573 pushes the polymeric mixture ingredients out of the first extruder 572, the combination of a perforated plate and rotary cutter 574 chops the exiting polymeric mixture into pellets 575. These pellets 575 are then preferably inserted into the hopper 576 of a second extruder 577. Again, through heating and a motorized screw 578, the polymeric mixture is melted. This time, when the polymeric mixture ingredients are pushed out of the extruder 577, a slotted plate at the end of the second extruder 579 is used to extrude a thin film of liquefied polymeric mixture 600. This thin film 600 might advantageously be on the order of 0.1–20 millimeters thick. In order to simplify the process steps, this thin film 600 could be produced by the first extruder 572 alone. Nonetheless, by eliminating the second extruder 577, there is a greater chance that the polymeric mixture will not be evenly mixed before it is extruded.

As with the processes shown in FIGS. 13 and 14, the liquefied polymeric mixture in the FIG. 15 process is preferably sandwiched between two sheets of fabric or other material 590, 592. As before, the fabric sheets are preferably unwound from fabric rolls 594, 596. Corona treaters 596, 598 may again be used to enhance the binding process. In this case, the thin film of liquefied polymeric mixture 600 is applied simultaneously between both sheets of fabric or other material 590, 592. Once the thin film of liquefied polymeric mixture 600 is inserted between the two sheets 590, 592, the two sheets 590, 592 are then preferably compressed and heated between the rollers of a laminating unit 602 and perforated and/or embossed, as desired, in a perforating/embossing unit 604. For convenient storage, the finished radiation protective fabric or other material 606 can then be wound into a final roll 608.

Figure 16:
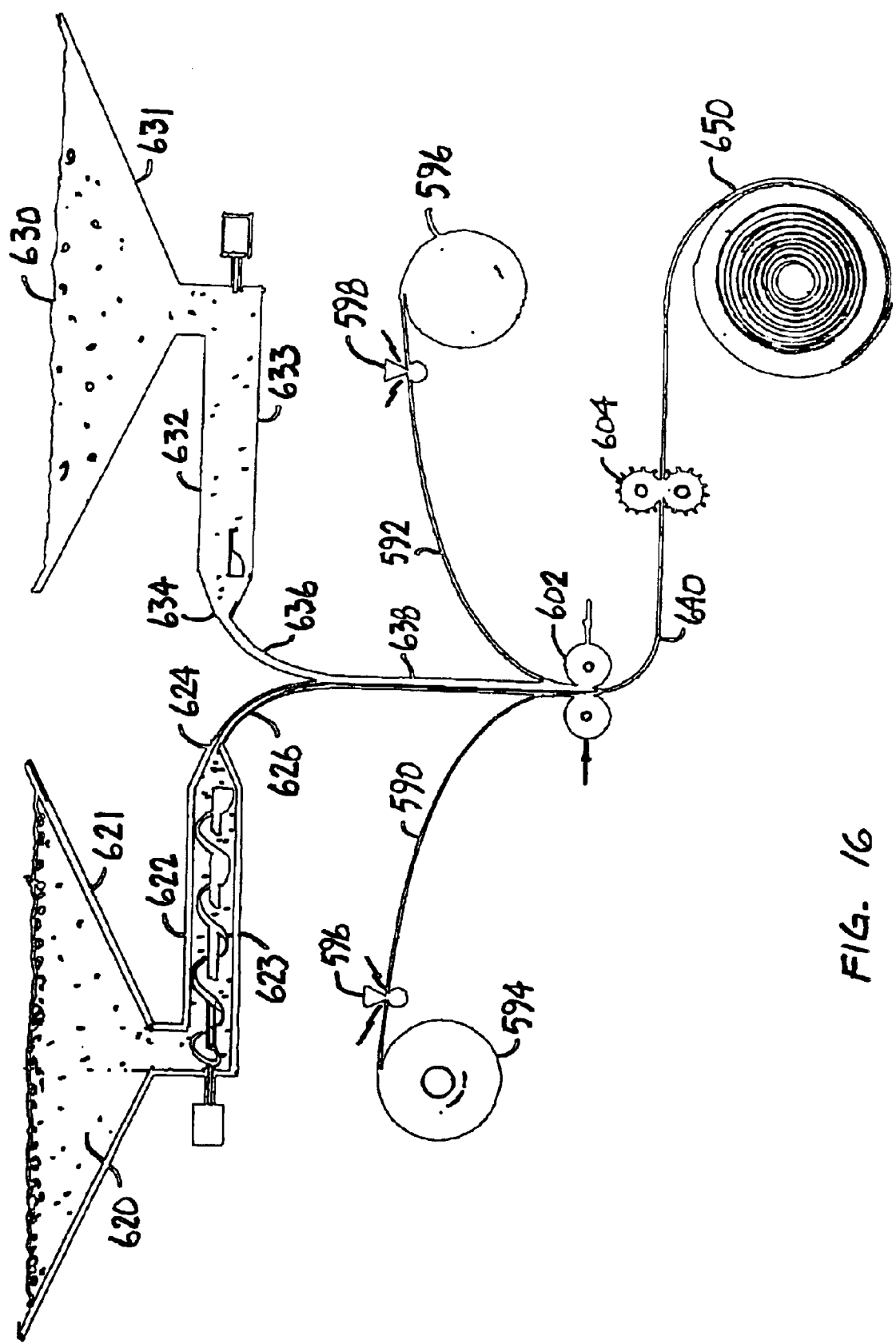
FIG. 16 shows an enhanced version of the process shown in FIG. 15 which creates an additional hazard protection layer.
Figure 17:
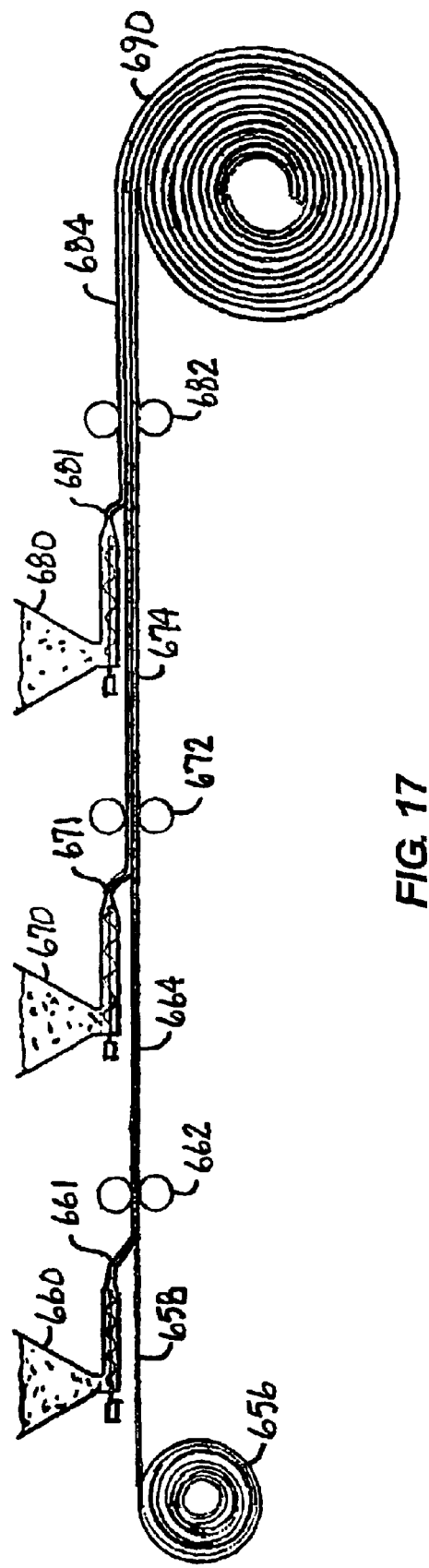
FIG. 17 shows an expanded process for creating a fabric with multiple forms of hazard protection.
Figure 2D:
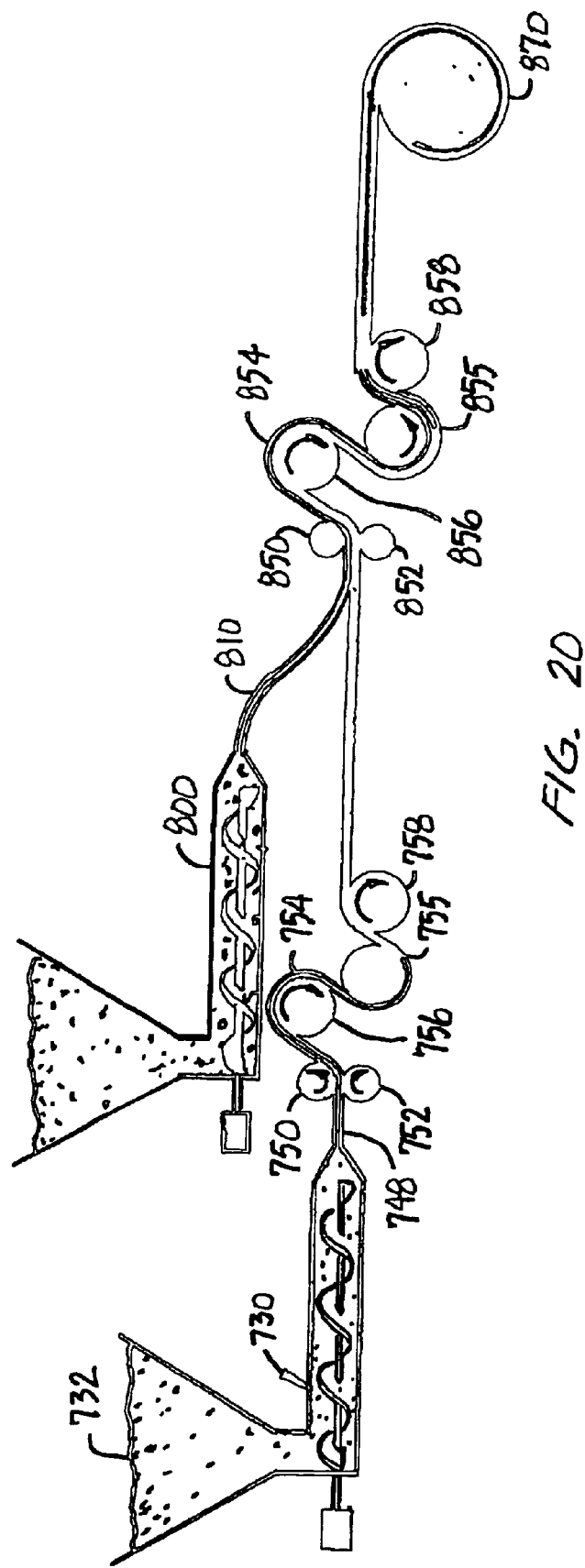

FIGS. 16 and 17 show an enhanced version of the process illustrated in FIG. 15 which can create fabrics with multiple hazard protections. Like the FIG. 15 process, the FIG. 16 process includes an extruder 622 for producing a radiation protective film 626. This radiation protective film is created by placing polymeric mixture ingredients 620 into a hopper 621. As before, the polymeric mixture preferably includes a polymer, one or more radiopaque materials and one or more additives. The hopper 621 feeds the polymeric mixture ingredients 620 into the extruder 622. Once in the extruder 622, the polymeric mixture ingredients are preferably heated into a viscous liquid state and mixed together through the turning action of the motorized extruder screw 623. When the polymeric mixture ingredients are pushed out of the extruder 622, a slotted plate 624 at the end of the extruder is used to extrude a thin film of liquefied polymeric mixture 626. If desired, a preceding extruder, similar to extruder 572 in FIG. 15, can be used to better insure that the polymeric mixture placed into the hopper 621 of extruder 622 is evenly mixed.

Unlike the FIG. 15 process, the second extruder 632 in the FIG. 16 process is placed in parallel with the first extruder 622 to simultaneously produce a second film 636 which is combined with the radiation protective first film 626. Preferably, the film 636 produced by the second extruder 632 provides a different type of hazard protection than the film 626 produced by the first extruder 622. For example, while the first extruder 622 can be advantageously used to produce a radiation protecting film 626, the second extruder 632 might advantageously be used to produce a complementary chemical, biological or fire protection film 636. To produce this complementary film 636, a different type of polymeric mixture is loaded into hopper 631, heated into a liquid form and mixed together through the turning action of the motorized extruder screw 633. As the motorized extruder screw 633 pushes the ingredients of this different polymeric mixture out of the extruder 632, a slotted plate 634 at the end of the extruder 632 is used to extrude a thin film of liquefied polymeric material 636.

The liquefied polymeric films 626, 636 from the two extruders 622, 632 are then preferably combined as they are sandwiched between two sheets of fabric or other material 590, 592. As before, the fabric sheets are preferably unwound from fabric rolls 594, 596. Corona treaters 596, 598 may again be used to enhance the binding process. Once the composite film 638 is inserted between the two sheets 590, 592, the two sheets 590, 592 are then preferably compressed and heated between the rollers of a laminating unit 602 and perforated and/or embossed, as desired, in a perforating/embossing unit 604. For convenient storage, the finished multiple hazard protection product 640 can then be would into a final roll 650.

FIG. 17 illustrates how the principles of FIGS. 13–16 can be used to create a fabric with any number of hazard protecting properties. The FIG. 17 process starts with a roll of fabric or other material 656. A sheet 658 is pulled from this fabric roll 656 and used as a substrate to deposit a polymeric layer from extruder 660. As an example, the sheet 658 might be a bullet or shrapnel protecting fabric produced from aramid and/or polyethylene fibers and the polymeric layer 661 might be the type of radiation protecting polymeric mixture previously described. Alternatively, the sheet 658 might be a chemical or fire resistant fabric, such as a flashspun polyethylene, polyvinyl chloride or polypropylene chemical protective fabric or an aramid fire resistant fabric. Using a second extruder 670, an additional layer of hazard protecting material, such as a chemical or biological protecting polymer layer, can then be added to the growing fabric 664. As the growing fabric moves forward, a third type of hazard protecting polymer 681, such as a fire protecting or heat dissipating polymer, can then be added using third extruder 680. As one skilled in the art will readily appreciate, this process could continue with as many further extruders as are need to impart all of the hazard protecting properties desired. After all of the desired polymer layers have been deposited, the composite fabric is then heated and compressed at laminating unit 682. The final multiple hazard protecting fabric 684 is then taken up into roll 690 for convenient storage and use.

Turning now to FIG. 18, a process is shown for forming a free standing film of hazard protecting polymer which does not need to be attached to a fabric or other material. Like the FIGS. 15–17 processes, this protective film process preferably starts by putting a suitable polymer mixture 732 into the hopper 734 of an extruder 730. In order to produce a radiation protective film, this polymer mixture 732 preferably consists of a polymer, one or more radiation protective materials and any appropriate additives. As the hopper 734 feeds the polymer mixture into the extruder 730, the polymer mixture is heated into a viscous liquid state and churned by the motorized extruder screw 736. As the motorized extruder screw 736 pushes the polymeric mixture out of the extruder 730, a slotted plate 738 at the end of the extruder produces a film 740 of radiation protective polymer which is deposited on endless conveyor belt 742 and cooled. The endless conveyor belt 742 preferably has a polished metal or Teflon® coating in order to prevent the film from needlessly sticking to the conveyor belt 742. To speed up the cooling process, a fan, blower or refrigeration unit (not shown) may be used. When the protective film 740 has sufficiently cooled, it can be wound into a final roll 744 for convenient storage. The final roll 744 of hazard protective film can then be used for any number of the applications discussed herein, including the manufacture of garments, tents, envelopes, wallpaper, liners, house sidings, house roofings, house foundations etc.

FIG. 19 shows a variation of the process illustrated in FIG. 18. Like the FIG. 18 process, the FIG. 19 process begins by putting the polymeric mixture 732 into the hopper 734 of an extruder 730. As the hopper 734 feeds the polymer mixture into the extruder 730, the polymeric mixture is again heated and churned by the motorized extruder screw 736. This time, though, the polymeric mixture is preferably heated to the consistency of a paste, rather than into a viscous liquid state. As the motorized extruder screw 736 pushes the polymeric mixture 748 out of the extruder 730, a slotted plate at the end of the extruder 738 again produces a film of hazard protective polymer 748 which is deposited on endless conveyor belt 742. This time, when the pasty film 748 exits the endless conveyor belt 742, it is fed into calender rollers 750, 752 which simultaneously heat and compress the pasty film 748. During this calendering process, the polymer molecules will typically cross-polymerize to form longer molecular chains which results in a stronger material. After leaving the calender rollers 750, 752, the finished film 754 is pulled by take up rollers 755, 756 and then preferably wound into a final roll 758 for convenient storage and later use.

FIG. 20 shows an enhanced version of the FIG. 19 process which can be used to create a free standing film capable of providing multiple hazard protections. Like the FIG. 19 process, the FIG. 20 process involves using an extruder 730 to heat and churn a polymer mixture 732 into a pasty film 748. In the preferred embodiment, this pasty film 748 is a polymer having radiation protection capabilities. As in the FIG. 19 process, this pasty film 748 is fed into calender rollers 750, 752 which simultaneously heat and compress the pasty film 748. After leaving the calendering rollers 750, 752, the film 754 is pulled by take up rollers 755, 756, 758 and moved forward to a second set of calendering rollers 850, 852. At the second set of calendering rollers, the film 754 is combined with a second film 810 produced by second extruder 800. As before, the second extruder 800 preferably produces a film 810 with a different type of hazard protection, such as chemical, biological, fire or heat protection. At the second set of calendering rollers, the two films 754, 810 are heated and compressed together. The composite film 854 is then pulled by a second set of take up rollers 854, 855, 858 and preferably wound into a final roll 870 for convenient storage and later use.

The processes described thus far for creating hazard protecting fabrics and films have involved polymeric mixtures. Nonetheless, at least in the context of imparting radiation protection, such polymers are not always needed. For example, radiation protection can be imparted to many types of fabrics, including cloth and paper, by soaking or dipping that fabric in a high concentration solution of a radiation protective materials, such as barium sulfate, or the reagents used to form that radiation protective material, such as barium chloride and sulfuric acid reagents. In the case of barium sulfate, this solution might advantageously be a 1 or 2 molar aqueous solution of barium sulfate precipitate (although other concentrations would also work). After the barium sulfate precipitate has been given an opportunity to thoroughly impregnate the fabric (e.g., by soaking overnight), the fabric can be removed from the barium sulfate solution and air dried. Drying can also be accomplished through use of a drying lamp or a microwave assembly. Since barium sulfate is capable of blocking radiation, the impregnation of barium sulfate into a fabric provides the ability to block radiation, while still allowing breathability.

To improve the efficiency of the impregnation process, various additives can advantageously be used. These additives can include adhesives, fixatives and/or emulsifiers to enhance the adhesion and/or thicken the solution of the radiation protective material. For example, an adhesive, such as Gum Arabic or Guar Gum, might be added to the previously mentioned barium sulfate solution to both thicken the solution and increase the adhesion of barium sulfate to the fabric. Alternatively, the adhesive might be added to the fabric, rather than the barium sulfate solution. The pre-treated fabric would then be soaked or dipped in the barium sulfate solution.

In addition to being soaked or dipped in a premade solution containing radiation protective material, the radiation protective materials of the present invention can also be impregnated into fabric using alternative techniques. Where the radiation protective material is in particulate form in solution (e.g., as a precipitate), one alternative technique is to choose a fabric with pores that are smaller in size than the particles of radiopaque material, but larger in size than the solvent (e.g., water or alcohol) used for the radiopaque solution. The radiopaque solution can then be passed through the fabric in a manner where the fabric will act as a filter to filter out the radiopaque particles while allowing the solvent to pass through. In the case of an aqueous solution containing barium sulfate precipitate, the filter pore size should be on the order of 2 microns and correspond to Whatman's pore size 5. Similarly, the solution of radiopaque particles can be sprayed onto the fabric. Again, after the fabric has been sufficiently impregnated with the radiopaque material, it can then be dried and assembled into a garment or other type of article.

In another polymer-free radiation protection embodiment, a reaction chamber can be created with a solutions of complementary reagents on each side and the fabric is placed in the middle. In the case of a barium sulfate radiopaque compound, these reagents might be barium chloride and sulfuric acid, respectively. In this barium sulfate example, because of the natural attraction of barium chloride to sulfuric acid, a chemical reaction will occur between the barium chloride and sulfuric acid which will leave behind a barium sulfate precipitate in the fabric.

In a further polymer-free radiation protection alternative, the fabric can be formed with one reagent incorporated within the fabric (e.g., as either a compound or free radical) and then exposed to the other reagent in order to create a resulting radiopaque impregnation. Again, in the case of a barium sulfate radiopaque compound, the fabric might advantageously be formed with barium or sulfate as part of the fabric and then exposed to the other compound in order to create the barium sulfate impregnation.

In the foregoing specification, the invention has been described with reference to specific preferred embodiments and methods. It will, however, be evident to those of skill in the art that various modifications and changes may be made without departing from the broader spirit and scope of the invention as set forth in the appended claims. For example, a number of the preferred embodiments relate to the creation of protective garments. Nonetheless, those of skill in the art know that protection against radiation, chemical, biological, metal projectile and fire hazards is needed in many other contexts. For example, the type of plasticized protective fabrics described in the present application could, for example, be used as liners for vehicles, x-ray scanning machines, x-ray rooms or airplane cabins. Moreover, the radiation protective fabrics or other materials of the present invention could also be formed into envelopes or pouches to protect sensitive materials (e.g., photographic film, electronics) from being damaged. Since the toxicity of lead is a real concern, the radiation protective materials of the present invention may also be used to replace lead in many of its current applications, including the solder used for printed circuitboards. As a still further example, the radiopaque materials of the present invention could be finely ground up and mixed into latex or oil based paints. Emulsifiers, binding agents or suspension agents may be added to such paints to keep the radiation protective materials well mixed so that they do not precipitate out of solution, emulsion or suspension. Through the addition of such radiation protective materials, radiation protection can be painted or coated onto any number of surfaces in order to provide protection from the dangers of radiation.

Those of skill in the art will readily understand that the principles and techniques described in this application are applicable to any field where radiation, harmful chemicals, infectious biological agents, metal projectiles or fire is present. The specification and drawings are, accordingly, to be regarded in an illustrative, rather than restrictive sense; the invention being limited only by the appended claims.

What is claimed is:

1. A radiation protective composite fabric comprising:
   a layer of fabric; and,
   a radiation protective polymeric mixture adhered or otherwise attached to said fabric, wherein said radiation protective polymeric mixture comprises a polymer and a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

2. The radiation protective fabric of claim 1 wherein said radiation protective material includes tungsten and/or barium sulfate.

3. The radiation protective fabric of claim 2 wherein said polymeric mixture comprises over 50% by weight of radiation protective materials and less than 50% by weight of polymer.

4. The radiation protective fabric of claim 1 wherein said polymer is selected from the group consisting of ethyl vinyl acetate and polyethylene.

5. The radiation protective fabric of claim 1 wherein said radiation protective materials are approximately 75% by weight of tungsten, 20% by weight of barium sulfate and 5% by weight of bismuth.

6. The radiation protective fabric of claim 1 wherein said layer of fabric is selected from the group of woven and non-woven fabrics.

7. The radiation protective fabric of claim 6 wherein said woven fabric is a woven cloth.

8. The radiation protective fabric of claim 6 wherein said non-woven fabric layer includes flashspun polyethylene.

9. A radiation protective composite fabric comprising:
   a layer of woven fabric;
   a layer of non-woven fabric; and,
   a radiation protective polymeric mixture interposed between said two layers of fabric, wherein said radiation protective polymeric mixture comprises more than 50% by weight of radiation protective materials including tungsten and/or barium sulfate and less than 50% by weight of polymer.

10. The radiation protective fabric of claim 9 wherein said layer of woven fabric is a woven cloth and said layer of non-woven fabric includes flashspun polyethylene.

11. The radiation protective composite fabric of claim 9 wherein said polymer is selected from the group of ethyl vinyl acetate and polyethylene.

12. A garment constructed from the composite fabric of claim 9.

13. A one piece jumpsuit garment constructed from the composite fabric of claim 9.

14. A two piece pant and jacket garment constructed from the composite fabric of claim 9.

15. An article capable of protecting a user against both radiation and projectile penetration hazards comprising:
   a polymeric layer which is resistant to projectile penetration; and,
   a radiation protective polymeric mixture adhered or otherwise attached to said projectile penetration resistant layer, wherein said radiation protective polymeric mixture comprises a polymer and a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

16. The hazard protecting article of claim 15 wherein said radiation protective material includes tungsten and/or barium sulfate.

17. The hazard protecting article of claim 15 wherein the polymer in said radiation protective polymeric mixture is selected from the group consisting of ethyl vinyl acetate, polyethylene, polyurethane, polyamide, polyvinyl chloride, polyvinyl alcohol, natural latex, polypropylene and polyester.

18. The hazard protecting article of claim 15 wherein said projectile penetration resistant layer is selected from the group consisting of aramid and polyethylene fabrics.

19. The hazard protecting article of claim 18 wherein said projectile penetration resistant layer includes multiple layers of aramid and/or polyethylene fabrics.

20. The hazard protecting article of claim 19 wherein at least some of said multiple layers of aramid and/or polyethylene fabrics are encapsulated by thermoplastic.

21. The hazard protecting article of claim 15 wherein said radiation protective polymeric mixture is laminated onto said projectile penetration resistant layer.

22. The hazard protecting article of claim 15 wherein said article is a bullet proof vest.

23. The hazard protecting article of claim 15 wherein said article is a bomb suit.

24. An article capable of protecting a user against both radiation and fire hazards comprising:
   a polymeric layer which is resistant to fire; and,
   a radiation protective polymeric mixture adhered or otherwise attached to said fire resistant layer, wherein said radiation protective polymeric mixture comprises a polymer and a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

25. The hazard protecting article of claim 24 wherein said radiation protective material includes tungsten and/or barium sulfate.

26. The hazard protecting article of claim 24 wherein the polymer in said radiation protective polymeric mixture is selected from the group of ethyl vinyl acetate, polyethylene, polyurethane, polyamide, polyvinyl chloride, polyvinyl alcohol, natural latex, polypropylene and polyester.

27. The hazard protecting article of claim 24 wherein said fire resistant layer includes aramid fibers and/or polytetrafluoroethylene.

28. The hazard protecting article of claim 24 wherein said radiation protective polymeric mixture is laminated onto said fire resistant layer.

29. The hazard protecting article of claim 24 wherein said article is a one-piece fire protection jumpsuit.

30. The hazard protecting article of claim 24 wherein said article is a two piece fire protection suit.

31. A polymeric mixture having radiation protecting and heat dissipating properties comprising:
   a polymer;
   a heat dissipating material selected from the group consisting of silver, copper, gold, aluminum, beryllium, calcium, tungsten, magnesium, zinc, iron, nickel, carbon, molybdenum and tin; and,
   a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

32. The polymeric mixture of claim 31 wherein said heat dissipating material is copper or aluminum and said radiation protective material is barium sulfate or tungsten.

33. The polymeric mixture of claim 31 wherein said mixture is laminated onto a woven or non-woven fabric.

34. An article capable of protecting a user against both projectile penetration and hazardous chemicals comprising:
a polymeric layer which is resistant to projectile penetration selected from the group of aramid fabrics and polyethylene fabrics; and,
a chemical protective layer adhered or otherwise attached to said projectile penetration resistant layer, wherein said chemical protective layer incorporates one or more polymers selected from the group of flashspun polyethylene, polypropylene, polyvinyl chloride, chlorinated polyethylene, nylon, polyurethane, aramid, polytetrafluoroethylene and neoprene.

35. The article of claim 34 further comprising a radiation protective layer adhered or otherwise attached to said projectile resistant and chemical protective layers wherein said radiation protective layer comprises a polymer and a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

36. The article of claim 35 wherein the polymer in said radiation protective layer is selected from the group consisting of ethyl vinyl acetate, polyethylene, polyurethane, polyamide, polyvinyl chloride, polyvinyl alcohol, natural latex, polypropylene and polyester.

37. The article of claim 34 further comprising a fire resistant layer adhered or otherwise attached to said projectile resistant and chemical protective layers wherein said fire resistant layer includes aramid fibers and/or polytetrafluoroethylene.

38. The article of claim 34 further comprising a heat dissipating layer adhered or otherwise attached to said projectile resistant and chemical protective layers wherein said heat dissipating layer comprises a polymer and a heat dissipating material selected from the group consisting of silver, copper, gold, aluminum, beryllium, calcium, tungsten, magnesium, zinc, iron, nickel, carbon, molybdenum and tin.

39. A multilayer article capable of protecting a user against projectile penetration, hazardous chemicals, radiation, fire and overheating comprising:
a polymeric layer which is resistant to projectile penetration selected from the group of aramid fabrics and polyethylene fabrics;
a chemical protective layer comprising one or more polymers selected from the group consisting of flashspun polyethylene, polypropylene, polyvinyl chloride, chlorinated ethylene, nylon, polyurethane, aramid and neoprene;
a radiation protective layer comprising a polymer selected from the group consisting of ethyl vinyl acetate, polyethylene, polyurethane, polyamide, polyvinyl chloride, polyvinyl alcohol, natural latex, polypropylene and polyester, and a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;
a fire resistant layer comprising aramid fibers and/or polytetrafluoroethylene; and,
a heat dissipating layer comprising a polymer and a heat dissipating material selected from the group consisting of silver, copper, gold, aluminum, beryllium, calcium, tungsten, magnesium, zinc, iron, nickel, carbon, molybdenum and tin.

40. A method for producing a radiation protective article comprising the steps of:
mixing a radiation protective material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

adhering said polymeric mixture to a fabric or other pliable material to make said fabric or other pliable material radiation protective; and, constructing a functional article from said radiation protective fabric or other pliable material.

41. The method of claim 40 wherein said radiation protective material comprises at least 50% of said polymeric mixture by weight.

42. The method of claim 40 further comprising a plurality of said radiation protective materials in said polymeric mixture.

43. The method of claim 42 wherein said plurality of radiation protective materials includes tungsten, barium sulfate and bismuth.

44. The method of claim 40 wherein said polymeric mixture further comprises one or more additives.

45. The method of claim 44 wherein one or more of said additives are selected from the group consisting of epoxy soybean oil, ethylene glycol and propylene glycol.

46. The method of claim 40 wherein said article is a one piece jumpsuit.

47. The method of claim 40 wherein said article is a two piece jacket and pant combination.

48. The method of claim 40 wherein said article is a surgical apron.

49. The method of claim 40 wherein said polymer is selected from the group consisting of polyurethane, polyamide, polyvinyl chloride, polyvinyl alcohol, natural latex, polyethylene, polypropylene, ethylene vinyl acetate and polyester.

50. The method of claim 40 wherein said fabric or other pliable material is a non-woven polymeric fabric.

51. The method of claim 50 wherein said non-woven polymeric fabric is selected from the group consisting of polypropylene, polyethylene, polyester and rayon.

52. The method of claim 40 wherein said fabric or other pliable material is paper.

53. A method for producing an article providing protection against radiation and projectile penetration comprising the steps of:

mixing a radiation protective material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

adhering said polymeric mixture to a fabric or other pliable material which is resistant to projectile penetration; and, constructing a functional article from said radiation and projectile protective fabric or other pliable material.

54. The method of claim 53 wherein said radiation protective material comprises at least 50% of said polymeric mixture by weight.

55. The method of claim 53 further comprising a plurality of said radiation protective materials in said polymeric mixture.

56. The method of claim 53 wherein said projectile penetration resistant fabric or other material includes aramid and/or polyethylene fabrics.

57. The method of claim 56 wherein said projectile penetration resistant layer includes multiple layers of aramid and/or polyethylene fabrics.

58. The method of claim 53 wherein said article is a one piece jumpsuit.

59. The method of claim 53 wherein said article is a two piece jacket and pant combination.

60. The method of claim 53 wherein said article is a bullet proof vest.

61. The method of claim 53 wherein said polymer is selected from the group consisting of polyurethane, polyamide, polyvinyl chloride, polyvinyl alcohol, natural latex, polyethylene, polypropylene, ethylene vinyl acetate and polyester.

62. A method for producing an article providing protection against radiation and fire hazards comprising the steps of:

mixing a radiation protective material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

adhering said polymeric mixture to a fabric or other pliable material which is resistant to fire; and, constructing a functional article from said radiation and fire protective fabric or other pliable material.

63. The method of claim 62 wherein said radiation protective material comprises at least 50% of said polymeric mixture by weight.

64. The method of claim 62 wherein said fire resistant fabric or other pliable material includes aramid fibers and/or polytetrafluoroethylene.

65. The method of claim 62 wherein said article is a one piece jumpsuit.

66. The method of claim 62 wherein said article is a two piece jacket and pant combination.

67. The method of claim 62 wherein said polymer is selected from the group consisting of polyurethane, polyamide, polyvinyl chloride, polyvinyl alcohol, natural latex, polyethylene, polypropylene, ethylene vinyl acetate and polyester.

68. A method for producing an article providing protection against radiation and overheating comprising the steps of:

mixing both a radiation protective material and a heat dissipating material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium and wherein said heat dissipating material is selected from the group consisting of silver, copper, gold, aluminum, beryllium, calcium, tungsten, magnesium, zinc, iron, nickel, carbon, molybdenum and tin;

adhering said polymeric mixture to a fabric or other pliable material; and, constructing a functional article from said radiation and heat dissipating fabric or other pliable material.

69. The method of claim 68 wherein said article is a one piece jumpsuit.

70. The method of claim 68 wherein said article is a two piece jacket and pant combination.

71. The method of claim 68 wherein said polymer is selected from the group consisting of polyurethane, polyamide, polyvinyl chloride, polyvinyl alcohol, natural latex, polyethylene, polypropylene, ethylene vinyl acetate and polyester.

72. A method for producing a radiation protective article comprising the steps of:

mixing a radiation protective material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

heating said polymeric mixture until it assumes a liquid form;

applying said liquid polymeric mixture to a first sheet of fabric or other pliable material;

pressing a second sheet of fabric of other pliable material together with said first sheet of fabric or other pliable material so that a layer with said polymeric mixture is interposed between said first and second sheets of fabric or other pliable material; and, constructing an article from said radiation protective fabric or other pliable material composite.

73. The method of claim 72 wherein said polymeric mixture is mixed and heated in one or more extruders and applied simultaneously from one of said extruders to said first and second sheets of fabric or other pliable material.

74. The method of claim 72 wherein said radiation protective material comprises at least 50% of said polymeric mixture by weight.

75. The method of claim 72 further comprising a plurality of said radiation protective materials in said polymeric mixture.

76. The method of claim 72 wherein one or more of said sheets of fabric or other pliable material is resistant to penetration by projectiles.

77. The method of claim 76 wherein said projectile penetration resistant fabric or other material includes aramid and/or polyethylene fibers.

78. The method of claim 72 wherein one or more of said sheets fabric or other pliable material is a fire resistant fabric.

79. The method of claim 78 wherein said fire resistant fabric includes aramid fibers and/or polytetrafluoroethylene.

80. The method of claim 72 wherein said polymeric mixture further includes a heat dissipating material selected from the group consisting of silver, copper, gold, aluminum, beryllium, calcium, tungsten, magnesium, zinc, iron, nickel, carbon, molybdenum and tin.

81. A method for producing a radiation protective film comprising the steps of:

mixing a radiation protective material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

heating said polymeric mixture until it assumes a pliable form; and, forming said pliable polymeric mixture into a film.

82. The method of claim 81 wherein said polymeric mixture is mixed and heated in an extruder and then deposited on an endless conveyor.

83. The method of claim 81 further comprising the step of pressing said pliable polymeric mixture between calender rollers.

84. The method of claim 81 wherein said radiation protective material comprises at least 50% of said polymeric mixture by weight.

85. A method for producing an article providing protection against multiple hazards comprising the steps of:

mixing a radiation protective material with a polymer to create a first polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglurnine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobeuamic Acid, Iocarmic Acid, Iocetamic Acid, lodipamide, Iodixanol, Iodized Oil, Iodoalphiomc Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Toxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

heating said first polymeric mixture until it assumes a liquid form;

applying said first liquid polymeric mixture to a sheet of fabric or other pliable material;

allowing said first liquid polymeric mixture to harden on said sheet of fabric or other pliable material;

heating a second polymeric mixture capable of providing protection against a different hazard;

applying said second polymeric mixture on top of said hardened first polymeric mixture; and, constructing an article from said polymerized fabric or other pliable material composite.

86. The method of claim 85 wherein said second polymeric mixture provides fire resistance.

87. The method of claim 85 wherein said second polymeric mixture resists projectile penetration.

88. The method of claim 85 wherein said second polymeric mixture dissipates heat readily.

89. A method for producing an article providing protection against multiple hazards comprising the steps of:

mixing a radiation protective material with a polymer to create a first polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;

heating said first polymeric mixture until it assumes a liquid form;

applying said first liquid polymeric mixture to a first sheet of fabric or other pliable material;

pressing a second sheet of fabric of other pliable material together with said first sheet of fabric or other pliable material so that a layer with said first polymeric mixture is interposed between said first and second sheets of fabric or other pliable material;

heating a second polymeric mixture capable of providing a different hazard protection until it assumes a liquid form;

applying said second polymeric mixture to a surface of either said first or second sheet of fabric or other pliable material which is free of said first polymeric mixture; and, constructing an article from said radiation protective fabric or other pliable material composite.

90. The method of claim 89 wherein said second polymeric mixture provides fire resistance.

91. The method of claim 89 wherein said second polymeric mixture resists projectile penetration.

92. The method of claim 89 wherein said second polymeric mixture dissipates heat readily.

93. An article capable of protecting a user against both radiation and chemical hazards comprising:

a polymeric layer which is resistant to chemical hazards; and, a radiation protective polymeric mixture adhered or otherwise attached to said chemical resistant layer, wherein said radiation protective polymeric mixture comprises a polymer and a radiation protective material selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

94. The hazard protecting article of claim 93 wherein said radiation protective material includes tungsten and/or barium sulfate.

95. The hazard protecting article of claim 93 wherein the polymer in said radiation protective polymeric mixture is selected from the group consisting of ethylene vinyl acetate, polyethylene, polyurethane, polyamide, polyvinyl chloride, polyvinyl alcohol, natural latex, polypropylene and polyester.

96. The hazard protecting article of claim 93 wherein said chemical resistant polymeric layer is constructed, at least in part, from the group consisting of polyethylene, flashspun polyethylene, polypropylene, polyvinyl chloride, chlorinated ethylene, nylon, polyurethane, aramid and neoprene.

97. The article of claim 93 wherein said article is a one piece jumpsuit.

98. The article of claim 93 wherein said article is a two piece jacket and pant combination.

99. A method for producing an article providing protection against radiation and chemical hazards comprising the steps of:
mixing a radiation protective material with a polymer to create a polymeric mixture, wherein said radiation protective material is selected from the group consisting of barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium;
adhering said polymeric mixture to a fabric or other pliable material which is resistant to chemicals; and,
constructing a functional article from said radiation and chemical protective fabric or other pliable material.

100. The method of claim 99 wherein said radiation protective material comprises at least 50% of said polymeric mixture by weight.

101. The method of claim 99 wherein said chemical resistant fabric or other pliable material includes, at least in part, flashspun polyethylene, polypropylene, polyvinyl chloride, chlorinated ethylene, nylon, polyurethane, aramid and/or neoprene.

102. The method of claim 99 wherein said article is one piece jumpsuit.

103. The method of claim 99 wherein said article is two piece jacket and pant combination.

104. The method of claim 62 wherein said polymer for said polymeric mixture is selected from the group consisting of polyurethane, polyamide, polyvinyl chloride, polyvinyl alcohol, natural latex, polyethylene, polypropylene, ethylene vinyl acetate and polyester.

105. The method of claim 99 wherein said second polymeric mixture provides chemical resistance.

106. The method of claim 99 wherein said second polymeric mixture provides chemical resistance.

* * * * *